United States Patent
MacInnis et al.

(10) Patent No.: US 6,963,613 B2
(45) Date of Patent: Nov. 8, 2005

(54) METHOD OF COMMUNICATING BETWEEN MODULES IN A DECODING SYSTEM

(75) Inventors: Alexander G. MacInnis, Los Altos, CA (US); Vivian Hsiun, Yorba Linda, CA (US); Sheng Zhong, Fremont, CA (US); Xiaodong Xie, Fremont, CA (US); Kimming So, Palo Alto, CA (US); Jose' R. Alvarez, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 635 days.

(21) Appl. No.: 10/114,797

(22) Filed: Apr. 1, 2002

(65) Prior Publication Data

US 2003/0185305 A1 Oct. 2, 2003

(51) Int. Cl.⁷ .................................................. H04N 7/12
(52) U.S. Cl. ............................. 375/240.25; 375/240.23
(58) Field of Search ....................... 375/240.23, 240.25; 382/245–247; 712/29, 210

(56) References Cited

U.S. PATENT DOCUMENTS

| | | | | |
|---|---|---|---|---|
| 5,469,273 A | * | 11/1995 | Demura | 382/244 |
| 5,684,534 A | * | 11/1997 | Harney et al. | 375/240.25 |
| 6,411,333 B1 | * | 6/2002 | Auld et al. | 348/441 |
| 6,445,314 B1 | * | 9/2002 | Zhang et al. | 341/67 |
| 6,538,656 B1 | | 3/2003 | Cheung et al. | |
| 6,771,196 B2 | * | 8/2004 | Hsiun | 341/106 |

OTHER PUBLICATIONS

Chang et al, "Maximum entropy co–processor for computed tomography", Custom Integrated Circuits Conference, IEEE, pp. 343.–346, May 1994.*

Martina et al, "Reconfigurable coprocessor based JPEG 2000 implementation", ICECS 2001, IEEE, vol. 3, pp. 1227–1230, Sep. 2001.*

(Continued)

*Primary Examiner*—Vu Le
(74) *Attorney, Agent, or Firm*—McAndrews, Held & Malloy, Ltd.

(57) ABSTRACT

Means of communicating between modules in a decoding system. A variable-length decoding accelerator communicates with a core decoder processor via a co-processor interface. In one embodiment, other decoding accelerators, in addition to the variable-length decoder, are adapted to provide status data indicative of their status to a co-processor status register. In another embodiment, a decoding accelerator is controlled by providing commands to the accelerator via posted write operations and polling the accelerator to determine whether the command has been performed. In still another embodiment, a first hardware accelerator communicates with a core decoder processor via a co-processor interface and other decoding accelerators, in addition to the first hardware accelerator, are adapted to provide status data indicative of their status to a co-processor status register.

26 Claims, 16 Drawing Sheets

OTHER PUBLICATIONS

U.S. Appl. No. 09/437,208 entitled "Graphics Display System", filed Nov. 9, 1999, Inventor: Alexander G. MacInnis et al.

U.S. Appl. No. 09/641,374 entitled "Video, Audio And Graphics Decode, Composite And Display System", filed Aug. 18, 2000, Inventor: Alexander G. MacInnis et al.

U.S. Appl. No. 09/641,936 entitled "Video And Graphics System With An MPEG Video Decoder For Concurrent Multi–Row Decoding", filed Aug. 18, 2000, Inventor: Ramanujan K. Valmiki et al.

U.S. Appl. No. 09/643,223 entitled "Video And Graphics System With MPEG Specific Data Transfer Commands", filed Aug. 18, 2000, Inventor: Ramanujan K. Valmiki et al.

U.S. Appl. No. 09/640,670 entitled "Video And Graphics System With Video Scaling", filed Aug. 18, 2000, Inventor: Alexander G. MacInnis et al.

U.S. Appl. No. 09/641,930 entitled "Video And Graphics System With A Video Transport Processor", filed Aug. 18, 2000, Inventor: Ramanujan K. Valmiki et al.

U.S. Appl. No. 09/641,935 entitled "Video And Graphics System With Parallel Processing Of Graphics Windows", filed Aug. 18, 2000, Inventor: Alexander G. MacInnis et al.

U.S. Appl. No. 09/642,510 entitled "Video And Graphics System With A Single–Port RAM", filed Aug. 18, 2000, Inventor: Xiaodong Xie.

U.S. Appl. No. 09/642,458 entitled "Video And Graphics System With An Integrated System Bridge Controller", Inventor: Alexander G. MacInnis et al.

* cited by examiner

METHOD OF COMMUNICATING BETWEEN MODULES IN A DECODING SYSTEM

INCORPORATION BY REFERENCE OF RELATED APPLICATIONS

The following U.S. Patent Applications are related to the present application and are hereby specifically incorporated by reference: patent application Ser. No. 10/114,679, entitled "METHOD OF OPERATING A VIDEO DECODING SYSTEM"; patent application Ser. No. 10/114,798, entitled "VIDEO DECODING SYSTEM SUPPORTING MULTIPLE STANDARDS"; patent application Ser. No. 10/114,886, entitled "MEMORY SYSTEM FOR VIDEO DECODING SYSTEM"; patent application Ser. No. 10/114,619, entitled "INVERSE DISCRETE COSINE TRANSFORM SUPPORTING MULTIPLE DECODING PROCESSES"; and patent application Ser. No. 10/113,094, entitled "RISC PROCESSOR SUPPORTING ONE OR MORE UNINTERRUPTIBLE CO-PROCESSORS"; all filed on Apr. 1, 2002. The following Provisional U.S. Patent Applications are also related to the present application and are hereby specifically incorporated by reference: Provisional Patent Application No. 60/369,144, entitled "VIDEO DECODING SYSTEM HAVING A PROGRAMMABLE VARIABLE LENGTH DECODER"; Provisional Patent Application No. 60/369,014, entitled "PROGRAMMABLE VARIABLE LENGTH DECODER"; Provisional Patent Application No. 60/369,210, entitled "DMA ENGINE HAVING MULTI-LEVEL COMMAND STRUCTURE"; and Provisional Patent Application No. 60/369,217, entitled "INVERSE QUANTIZER SUPPORTING MULTIPLE DECODING PROCESSES"; all filed on Apr. 1, 2002.

FIELD OF THE INVENTION

The present invention relates generally to media decoding systems, and, more particularly, to communication between modules in a decoding system.

BACKGROUND OF THE INVENTION

Digital video decoders decode compressed digital data that represent video images in order to reconstruct the video images. A highly optimized hardware architecture can be created to address a specific video decoding standard, but this kind of solution is typically limited to a single format. On the other hand, a fully software based solution is capable of handling any encoding format, but at the expense of performance. Currently the latter case is solved in the industry by the use of general-purpose processors running on personal computers. Sometimes the general-purpose processor is accompanied by digital signal processor (DSP) oriented acceleration modules, like multiply-accumulate (MAC), that are intimately tied to the particular internal processor architecture. For example, in one existing implementation, an Intel Pentium processor is used in conjunction with an MMX acceleration module.

Others in the industry have addressed the problem of accommodating different encoding/decoding algorithms by designing special purpose DSPs in a variety of architectures. Some companies have implemented Very Long Instruction Word (VLIW) architectures more suitable to video processing and able to process several instructions in parallel. In these cases, the processors are difficult to program when compared to a general-purpose processor. In special cases, where the processors are dedicated for decoding compressed video, special processing accelerators are tightly coupled to the instruction pipeline and are part of the core of the main processor.

Yet others in the industry have addressed the problem of accommodating different encoding/decoding algorithms by simply providing multiple instances of hardware dedicated to a single algorithm.

All of the above-mentioned decoding schemes involve complex interactions amongst the various modules in the decoding system. Intimate and efficient communication between multiple modules in the decoding system would greatly increase the decoding system's efficiency and performance.

Further limitations and disadvantages of conventional and traditional approaches will become apparent to one of skill in the art through comparison of such systems with the present invention as set forth in the remainder of the present application with reference to the drawings.

SUMMARY OF THE INVENTION

One aspect of the present invention is directed to a decoding system having a core decoder processor and an entropy decoding accelerator. The core decoder processor performs decoding functions on a coded data stream and has a co-processor interface. The entropy decoding accelerator performs entropy decoding operations on variable-length codes or arithmetic-coded codes in the data stream. The entropy decoding accelerator is coupled to the co-processor interface of the core decoder processor. The term "entropy decoding" may be used generically to refer to variable length decoding, arithmetic decoding, or variations on either of these.

Another embodiment of the present invention is directed to a method of controlling a decoding accelerator. Pursuant to the method, a command is provided to the accelerator via a posted write operation and the accelerator is polled to determine whether the command has been performed.

Another embodiment of the present invention is directed to a decoding system having a core decoder processor and first and second decoding accelerators. The core decoder processor performs decoding functions on a coded data stream and has a co-processor interface. The co-processor interface includes a co-processor status register adapted to receive a status of a co-processor. The first decoding accelerator assists the core decoder processor with a first decoding function and is coupled to the core decoder processor via the co-processor interface. The second decoding accelerator assists the core decoder processor with a second decoding function. Both the first and second decoding accelerators are adapted to provide status data indicative of their status to the co-processor status register.

It is understood that other embodiments of the present invention will become readily apparent to those skilled in the art from the following detailed description, wherein embodiments of the invention are shown and described only by way of illustration of the best modes contemplated for carrying out the invention. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

DESCRIPTION OF THE DRAWINGS

These and other features, aspects, and advantages of the present invention will become better understood with regard to the following description, appended claims, and accompanying drawings where:

DETAILED DESCRIPTION

Figure 1:
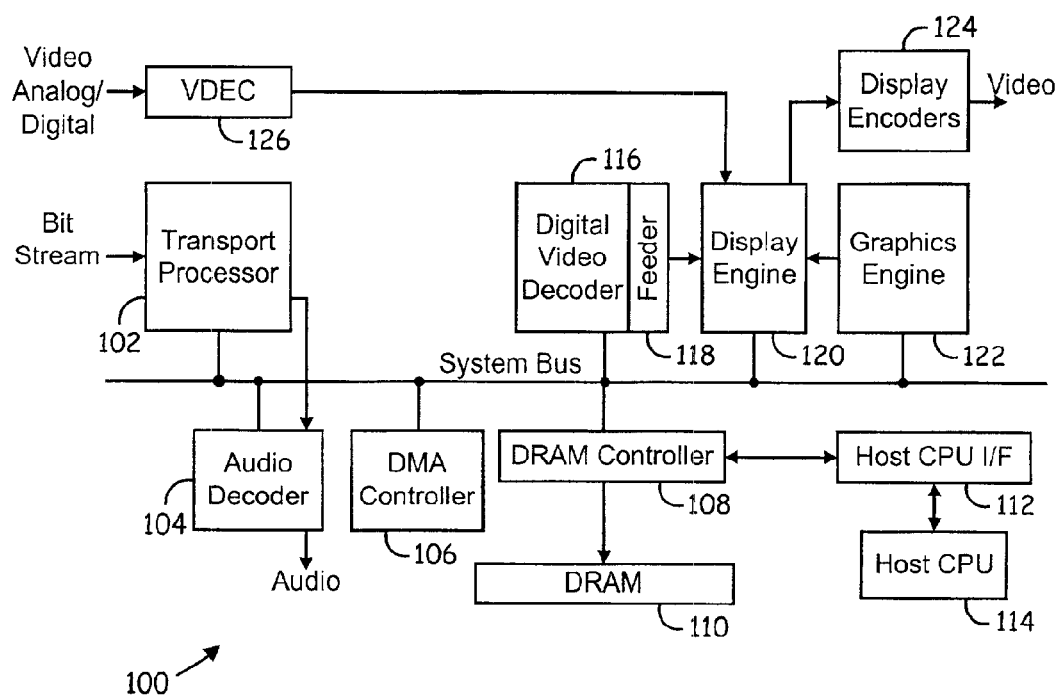
FIG. 1 is a functional block diagram of a digital media system in which the present invention may be illustratively employed.

The present invention forms an integral part of a complete digital media system and provides flexible decoding resources. FIG. 1 is a functional block diagram of a digital media system in which the present invention may be illustratively employed. It will be noted, however, that the present invention can be employed in systems of widely varying architectures and widely varying designs.

The digital media system of FIG. 1 includes transport processor 102, audio decoder 104, direct memory access (DMA) controller 106, system memory controller 108, system memory 110, host CPU interface 112, host CPU 114, digital video decoder 116, display feeder 118, display engine 120, graphics engine 122, display encoders 124 and analog video decoder 126. The transport processor 102 receives and processes a digital media data stream. The transport processor 102 provides the audio portion of the data stream to the audio decoder 104 and provides the video portion of the data stream to the digital video decoder 116. In one embodiment, the audio and video data is stored in main memory 110 prior to being provided to the audio decoder 104 and the digital video decoder 116. The audio decoder 104 receives the audio data stream and produces a decoded audio signal. DMA controller 106 controls data transfer amongst main memory 110 and memory units contained in elements such as the audio decoder 104 and the digital video decoder 116. The system memory controller 108 controls data transfer to and from system memory 110. In an illustrative embodiment, system memory 110 is a dynamic random access memory (DRAM) unit. The digital video decoder 116 receives the video data stream, decodes the video data and provides the decoded data to the display engine 120 via the display feeder 118. The analog video decoder 126 digitizes and decodes an analog video signal (NTSC or PAL) and provides the decoded data to the display engine 120. The graphics engine 122 processes graphics data in the data stream and provides the processed graphics data to the display engine 120. The display engine 120 prepares decoded video and graphics data for display and provides the data to display encoders 124, which provide an encoded video signal to a display device.

Figure 2:
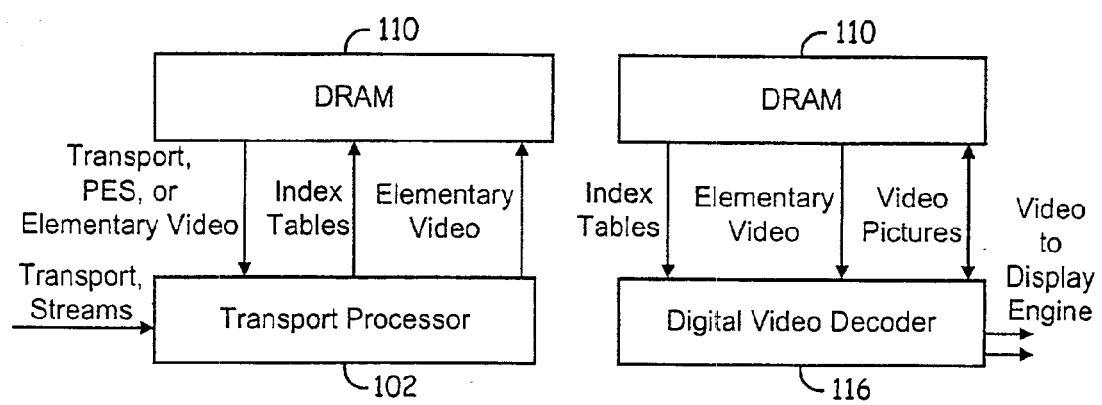
FIG. 2 is a functional block diagram demonstrating a video decode data flow according to an illustrative embodiment of the present invention.

FIG. 2 is a functional block diagram demonstrating a video decode data flow according to an illustrative embodiment of the present invention. Transport streams are parsed by the transport processor 102 and written to main memory 110 along with access index tables. The video decoder 116 retrieves the compressed video data for decoding, and the resulting decoded frames are written back to main memory 110. Decoded frames are accessed by the display feeder interface 118 of the video decoder for proper display by a display unit. In FIG. 2, two video streams are shown flowing to the display engine 120, suggesting that, in an illustrative embodiment, the architecture allows multiple display streams by means of multiple display feeders.

Aspect of the present invention relate to the architecture of digital video decoder 116. In accordance with an exemplary embodiment of the present invention, a moderately capable general purpose CPU with widely available development tools is used to decode a variety of coded streams using hardware accelerators designed as integral parts of the decoding process.

Figure 3:
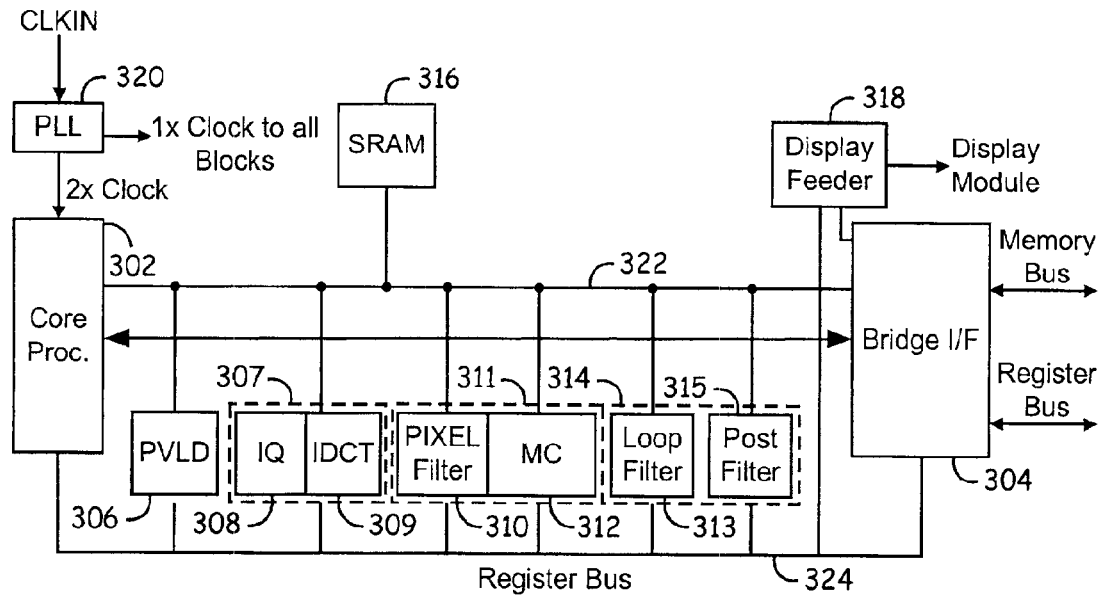
FIG. 3 is a functional block diagram of a decoding system according to an illustrative embodiment of the present invention.

FIG. 3 is a functional block diagram of a digital video decoding system 300 according to an illustrative embodiment of the present invention. The digital video decoding system 300 of FIG. 3 can illustratively be employed to implement the digital video decoder 116 of FIGS. 1 and 2. Video decoding system 300 includes core decoder processor 302, DMA Bridge 304, decoder memory 316, display feeder 318, phase-locked loop element 320, data bus 322, address bus 323, register bus 324 and acceleration modules 306, 308, 309, 310, 312, 313 and 315. The acceleration modules include variable-length decoder (VLD) 306, inverse quantization (IQ) module 308, inverse discrete cosine transform (IDCT) module 309, pixel filter 310, motion compensation module 312, loop filter 313 and post filter 315. The acceleration modules 306, 308, 309, 310 and 312 are hardware accelerators that accelerate special decoding tasks that would otherwise be bottlenecks for real-time video decoding if these tasks were handled by the core processor 302 alone. This helps the core processor achieve the required performance. In an illustrative embodiment, modules 308 and 309 are implemented in the form of a single transform engine that handles all functionality, but which is conceptually equivalent to the union of modules 308 and 309. Also in an illustrative embodiment, modules 310 and 312 are implemented in the form of a filter engine which consists of an internal SIMD (single instruction multiple data) processor and a general purpose controller to interface to the rest of the system, but which is conceptually equivalent to the union of modules 310 and 312. Furthermore, in an exemplary embodiment, loop filter 313 and post filter 315 form part of another filter engine which is another instance of the same programmable module used to implement pixel filter 310 and motion compensation module 312 except that it is programmed to implement the functionality of a loop filter 313 and post filter 315.

The core processor 302 is the central control unit of the decoding system 300. The core processor 302 prepares the data for decoding. The core processor 302 also orchestrates the macroblock (MB) processing pipeline for the acceleration modules and fetches the required data from main memory 110 via the DMA bridge 304. The core processor 302 also handles some data processing tasks. Picture level processing, including sequence headers, GOP headers, picture headers, time stamps, macroblock-level information except the block coefficients, and buffer management, are performed directly and sequentially by the core processor 302, without using the accelerators 304, 306, 308, 309, 310, 312, 313 and 315 other than the VLD 306 (which accelerates general bitstream parsing). Picture level processing does not overlap with slice level/macroblock decoding. In an illustrative embodiment of the present invention, the core processor 302 is a MIPS processor, such as a MIPS32 implementation, for example.

The most widely-used compressed video formats fall into a general class of DCT-based, variable-length coded, block-motion-compensated compression algorithms. As mentioned above, these types of algorithms encompass a wide class of international, public and private standards, including MPEG-1, MPEG-2 (SD/HD), MPEG-4, H.263, H.263+, H.26L, Microsoft Corp, Real Networks, QuickTime, and others. Each of these algorithms implement some or all of the functions implemented by variable-length decoder 306, and the other hardware accelerators 308, 309, 310 312, 313 and 315, in different ways that prevent fixed hardware implementations from addressing all requirements without duplication of resources. In accordance with one aspect of the present invention, variable-length decoder 306 and the other hardware accelerators 308, 309, 310, 312, 313 and 315 are internally programmable to allow changes according to various processing algorithms. This enables a decoding system that decodes most standards efficiently and flexibly.

The decoding system of the present invention employs high-level granularity acceleration with internal programmability to achieve the requirements above by implementation of very fundamental processing structures that can be configured dynamically by the core decoder processor. This contrasts with a system employing fine-granularity acceleration, such as multiply-accumulate (MAC), adders, multipliers, FFT functions, DCT functions, etc. In a fine-granularity acceleration system, the decompression algorithm has to be implemented with firmware that uses individual low-level instructions (like MAC) to implement a high-level function, and each instruction runs on the core processor. In the high-level granularity system of the present invention, the firmware configures, i.e. programs, variable-length decoder 306 and the other hardware accelerators 308, 309, 310, 312, 313 and 315, which in turn represent high-level functions (like variable-length decoding) that run without intervention from the main core processor 302. Therefore, each hardware accelerator 306, 308, 309, 310, 312, 313 and 315 runs in parallel according to a processing pipeline dictated by the firmware in the core processor 302. Upon completion of the high-level functions, each accelerator notifies the main core processor 302, which in turn decides what the next processing pipeline step should be.

In an illustrative embodiment of the present invention, the software control consists of a simple pipeline that orchestrates decoding by issuing commands to each hardware accelerator module for each pipeline stage, and a status request mechanism that makes sure that all modules have completed their pipeline tasks before issuing the start of the next pipeline stage. Each hardware module 306, 308, 309, 310, 312, 313 and 315 performs its task after being so instructed by the core processor 302. In an illustrative embodiment of the present invention, each hardware module includes a status register that indicates whether the module is active or inactive. The status register may also indicate the internal state of the hardware accelerator at a specific point during the processing stage of the hardware accelerator. The core processor 302 polls the status register to determine whether the hardware module has completed its task. In an alternative embodiment, the hardware accelerators share a status register.

Variable-length decoder 306 is a hardware accelerator that accelerates the process of decoding variable-length codes, which might otherwise be a bottleneck for a decoding process if it were handled by the core processor 302 alone. The VLD 306 performs decoding of variable length codes (VLC) in the compressed bit stream to extract coefficients, such as DCT coefficients, from the compressed data stream. Different coding formats generally have their own special VLC tables. According to the present invention, the VLD module 306 is internally programmable to allow changes according to various processing algorithms. The VLD 306 is completely configurable in terms of the VLC tables it can process. The VLD 306 can accommodate different VLC tables on a macroblock-to-macroblock basis. In an illustrative embodiment of the present invention, the VLD 306 includes a register that the core processor can program to guide the VLD 306 to search for the VLC table of the appropriate encoding/decoding algorithm.

The VLD 306 is designed to support the worst-case requirement for VLD operation, such as with MPEG-2 HDTV (MP@HL) for video decoding, while retaining its full programmability. The VLD 306 includes a code table random access memory (RAM) for fastest performance. Some compression/decompression formats, such as Windows Media Technology 8 (WMT8) video, may require larger code tables that do not fit entirely within the code RAM in the VLD 306. For such cases, according to an illustrative embodiment of the present invention, the VLD 306 can make use of both the decoder memory 316 and the main memory 110 as needed. Performance of VLC decoding is reduced somewhat when codes are searched in video memory 316 and main memory 110. Therefore, for formats that require large amounts of code, the most common codes are stored in the VLD code RAM, the next most common codes are stored in decoder memory 316, and the least common codes are stored in main memory 110. Also, such codes are stored in decoder memory 316 and main memory 110 such that even when extended look-ups in decoder memory 316 and main memory 110 are required, the most commonly occurring codes are found more quickly. This allows the overall performance to remain exceptionally high. The VLD 306 decodes variable length codes in as little as one clock, depending on the specific code table in use and the specific code being decoded.

In an illustrative embodiment of the present invention, the VLD 306 helps the core processor 104 to decode header information in the compressed bitstream. In an illustrative embodiment of the present invention, the VLD module 306 is architected as a coprocessor to the decoder processor 110. That is, it can operate on a single-command basis where the core processor issues a command (via a coprocessor instruction) and waits (via a Move From Coprocessor instruction) until it is executed by the VLD 306, without polling to determine completion of the command. This increases performance when a large number of VLC codes that are not DCT coefficients are parsed.

In an alternative embodiment, the VLD 306 is architected as a hardware accelerator. In this embodiment, the VLD 306 includes a status register that indicates whether the module is active or inactive. The core processor 302 polls the status register to determine whether the VLD 306 has completed its tasks. In an alternative embodiment, the VLD 306 shares a status register with other decoding elements such as decoding elements 308, 309, 310 and 312.

In an illustrative embodiment of the present invention, the VLD module 306 includes two variable-length decoders. Each of the two variable-length decoders can be hardwired to efficiently perform decoding according to a particular compression standard, such as MPEG2HD. HD. In an illustrative embodiment, one or both of two VLDs can be optionally set as a programmable VLD engine, with a code RAM to hold VLC tables for other media coding formats. The two VLD engines are controlled independently by the core processor 302, and either one or both of them will be employed at any given time, depending on the application.

The VLD 306 can operate on a block-command basis where the core processor 302 commands the VLD 306 to decode a complete block of VLC codes, such as DCT coefficients, and the core processor 302 continues to perform other tasks in parallel. In this case, the core processor 302 verifies the completion of the block operation by checking a status bit in the VLD 306. The VLD 306 produces results (tokens) that are stored in decoder memory 316.

The VLD 306 checks for invalid codes and recovers gracefully from them. Invalid codes may occur in the coded bit stream for a variety of reasons, including errors in the video encoding, errors in transmission, and discontinuities in the stream.

The inverse quantizer module 308 performs run-level code (RLC) decoding, inverse scanning (also called zig-zag scanning), inverse quantization and mismatch control. The coefficients, such as DCT coefficients, extracted by the VLD 306 are processed by the inverse quantizer 308 to bring the coefficients from the quantized domain to the DCT domain. In an exemplary embodiment of the present invention, the IQ module 308 obtains its input data (run-level values) from the decoder memory 316, as the result of the VLD module 306 decoding operation. In an alternative embodiment, the IQ module 308 obtains its input data directly from the VLD 306. This alternative embodiment is illustratively employed in conjunction with encoding/decoding algorithms that are relatively more involved, such as MPEG-2 HD decoding, for best performance. The run-length, value and end-of-block codes read by the IQ module 308 are compatible with the format created by the VLD module when it decodes blocks of coefficient VLCs, and this format is not dependent on the specific video coding format being decoded.

The IDCT module 309 performs the inverse transform to convert the coefficients produced by the IQ module 308 from the frequency domain to the spatial domain. The primary transform supported is the discrete cosine transform (DCT) as specified in MPEG-2, MPEG-4, IEEE, and several other standards. The IDCT module 309 also supports alternative related transforms, such as the "linear" transform in H.26L, which is not quite the same as IDCT.

In an illustrative embodiment of the present invention, the coefficient input to the IDCT module 309 is read from decoder memory 316, where it was placed after inverse quantization by the IQ module 308. The transform result is written back to decoder memory 316. In an exemplary embodiment, the IDCT module uses the same memory location in decoder memory 316 for both its input and output, allowing a savings in on-chip memory usage. In an alternative embodiment, the coefficients produced by the IQ module are provided directly to the IDCT module 309, without first depositing them in decoder memory 316. To accommodate this direct transfer of coefficients, in one embodiment of the present invention, the IQ module 308 and IDCT module 309 are part of the same hardware module and use a common interface to the core processor. In an exemplary embodiment, the transfer of coefficients from the IQ module 308 to the IDCT module 309 can be either direct or via decoder memory 316. For encoding/decoding algorithms that are relatively more involved, such as MPEG-2 HD decoding, the transfer is direct in order to save time and improve performance.

The pixel filter 310 performs pixel filtering and interpolation as part of the motion compensation process. Motion compensation is performed when an image from a previous frame is contained in the present frame, just at a different location within the frame. Rather than recreate the image anew from scratch, the previous image is used and just moved to the proper location within the frame. For example, assume the image of a person's eye is contained in a macroblock of data at frame #0. Say that the person moved to the right so that at frame #1 the same eye is located in a different location in the frame. Motion compensation uses the eye from frame #0 (the reference frame) and simply moves it to the new location in order to get the new image. The new location is indicated by motion vectors that denote the spatial displacement in frame #1 with respect to reference frame #0.

The pixel filter 310 performs the interpolation necessary when a reference block is translated (motion-compensated) into a position that does not land on whole-pixel locations. For example, a hypothetical motion vector may indicate to move a particular block 10.5 pixels to the right and 20.25 pixels down for the motion-compensated prediction. In an illustrative embodiment of the present invention, the motion vectors are decoded by the VLD 306 in a previous processing pipeline stage and are stored in the core processor 302. Thus, the pixel filter 310 gets the motion information as vectors and not just bits from the bitstream during decoding of the "current" macroblock in the "current" pipeline stage. The reference block data for a given macroblock is stored in memory after decoding of said macroblock is complete. In an illustrative embodiment, the reference picture data is stored in decoder memory 316. If and when that reference macroblock data is needed for motion compensation of another macroblock, the pixel filter 310 retrieves the reference macroblock pixel information from decoder memory 316 and the motion vector from the core processor 302 and performs pixel filtering. The pixel filter stores the filter result (pixel prediction data) in decoder memory 316.

The motion compensation module 312 reconstructs the macroblock being decoded by performing the addition of the decoded difference (or "error") pixel information from the IDCT 309 to the pixel prediction data from the output of the pixel filter 310. The pixel filter 310 and motion compensation module 312 are shown as one module in FIG. 3 to emphasize a certain degree of direct cooperation between them.

The loop filter 313 and post filter 315 perform de-blocking filter operations. Some decoding algorithms employ a loop filter and others employ a post filter. The difference is where in the processing pipeline each filter 313, 315 does its work. The loop filter 313 processes data within the reconstruction loop and the results of the filter are used in the actual reconstruction of the data. The post filter 315 processes data that has already been reconstructed and is fully decoded in the two-dimensional picture domain. In an illustrative embodiment of the present invention, the loop filter 313 and post filter 315 are combined in one filter module.

The input data to the loop filter 313 and post filter 315 comes from decoder memory 316. This data includes pixel and block/macroblock parameter data generated by other modules in the decoding system 300. In an illustrative embodiment of the present invention, the loop filter 313 and post filter 315 have no direct interfaces to other processing modules in the decoding system 300. The output data from the loop filter 313 and post filter 315 is written into decoder memory 316. The core processor 302 then causes the processed data to be put in its correct location in main memory.

In an illustrative embodiment of the present invention, the hardware accelerators 308, 309, 310, 312, 313 and 315 (in addition to VLD 306) are configurable to operate according to any of a plurality of compression/decompression standards. In an exemplary embodiment, each of the hardware accelerators 308, 309, 310, 312, 313 and 315 have one or more registers that can be programmed by the core decoder processor 302 in order to configure the accelerator to perform its functions according to the format of the bitstream to be decoded.

At the macroblock level, the core processor 302 interprets the decoded bits for the appropriate headers and decides and coordinates the actions of the hardware blocks 306, 308, 309, 310, 312, 313 and 315. Specifically, all macroblock header information, from the macroblock address increment (MBAinc) to motion vectors (MVs) and to the cbp pattern, in the case of MPEG2 decoding, for example, is derived by the core processor 302. The core processor 302 stores related information in a particular format or data structure (determined by the hardware module specifications) in the appropriate buffers in the decoder memory 316. For example, the quantization scale is passed to the buffer for the IQ engine 308; macroblock type, motion type and pixel precision are stored in the parameter buffer for the pixel filter engine 310. The core processor keeps track of certain information in order to maintain the correct pipeline. For example, motion vectors of the macroblock are kept as the predictors for future motion vector derivation.

Decoder memory 316 is used to store macroblock data and other time-critical data used during the decode process. Each hardware block 306, 308, 309, 310, 312, 314 accesses decoder memory 316 to either read the data to be processed or write processed data back. In an illustrative embodiment of the present invention, all currently used data is stored in decoder memory 316 to minimize access to main memory. Each hardware module 306, 308, 309, 310, 312, 314 is assigned one or more buffers in decoder memory 316 for data processing. Each module accesses the data in decoder memory 316 as the macroblocks are processed through the system. In an exemplary embodiment, decoder memory 316 also includes parameter buffers that are adapted to hold parameters that are needed by the hardware modules to do their job at a later macroblock pipeline stage. The buffer addresses are passed to the hardware modules by the core processor 302. In an illustrative embodiment, decoder memory 316 is a static random access memory (SRAM) unit.

The core processor 302, DMA Bridge 304, VLD 306, IQ 308, IDCT 309, pixel filter 310, motion compensation module 312, loop filter 313 and post filter 315 have access to decoder memory 316 via the internal bus 322. The VLD 306, IQ 308, IDCT 309, pixel filter 310, motion compensation module 312, loop filter 313 and post filter 315 use the decoder memory 316 as the source and destination memory for their normal operation. The CPU 114 has access to decoder memory 316, and the DMA engine 304 can transfer data between decoder memory 316 and the main system memory (DRAM) 110. The arbiter for decoder memory 316 is in the bridge module 304.

The bridge module 304 arbitrates and moves picture data between decoder memory 316 and main memory. The bridge interface 304 includes an internal bus network that includes arbiters and a direct memory access (DMA) engine. The DMA bridge 304 serves as an asynchronous interface to the system buses.

The display feeder module 318 reads decoded frames from main memory and manages the horizontal scaling and displaying of picture data. The display feeder 318 interfaces directly to a display module. In an illustrative embodiment, the display feeder 318 includes multiple feeder interfaces, each including its own independent color space converter and horizontal scaler. The display feeder 318 handles its own memory requests via the bridge module 304. In an illustrative embodiment of the present invention, decoding system 300 does not contain a display feeder 318 because the system 100 in which the decoding system resides includes a display feeder.

Figure 4:
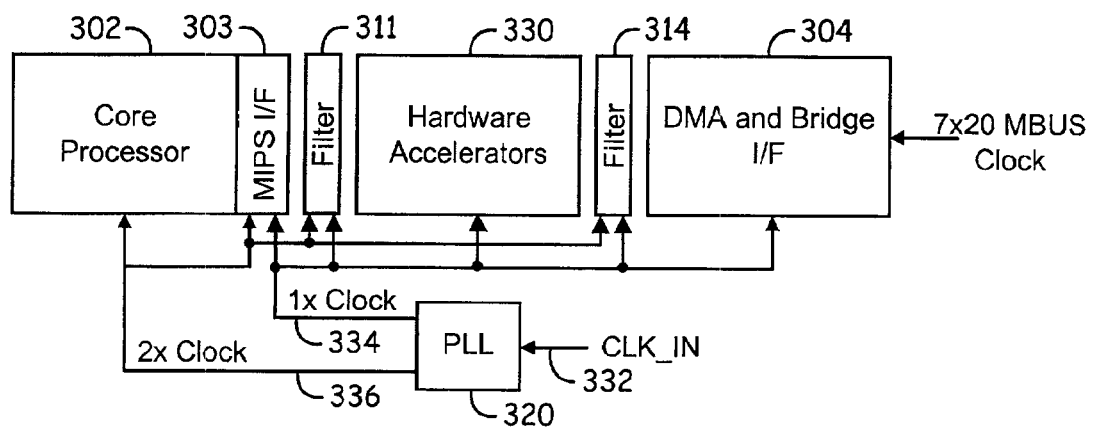
FIG. 4 is a block diagram depicting a clocking scheme for decoding system 300 according to an illustrative embodiment of the present invention.

FIG. 4 is a block diagram depicting a clocking scheme for decoding system 300 according to an illustrative embodiment of the present invention. In FIG. 4, elements that are common to FIG. 3 are given like reference numbers. Hardware accelerators block 330 includes, for example, VLD 306, IQ 308, IDCT module 309, pixel filter 310, motion compensation module 312, loop filter 313 and post filter 315. In an illustrative embodiment of the present invention, the core processor 302 runs at twice the frequency of the other processing modules. In an exemplary embodiment, the core processor runs at 243 MHz and the individual modules at half this rate, i.e., 121.5 MHz. An elegant, flexible and efficient clock strategy is achieved by generating two internal clocks in an exact 2:1 relationship to each other. The system clock signal (CLK_IN) 332 is used as input to the phase-locked loop element (PLL) 320, which is a closed-loop feedback control system that locks to a particular phase of the system clock to produce a stable signal with little jitter. The PLL element 320 generates a 1× clock (targeting, e.g., 121.5 MHz) for the hardware accelerators 330, DMA bridge 304 and the core processor bus interface 303, while generating a 2× clock (targeting, e.g., 243 MHz) for the core processor 302 and the core processor bus interface 303. This is to cover the possibility that the core processor 302 will not meet timing at 1× clock, e.g., 243 MHz. It also allows the decoding system 300 to run faster than 1× clock if the circuit timing supports it. In an illustrative embodiment, some individual hardware accelerator modules run internally with the 2× clock, but interface to the rest of the system with the 1× clock. In an illustrative embodiment, the core processor clock is rising-edge aligned to the clocks of the accelerators 306, 308, 309, 310, 312, 313 and 315, and said clocks are synchronous to each other. Thus, the rising edge of the core processor clock coincides with the rising edge of the clocks of the accelerators every other core processor clock cycle.

Figure 5:
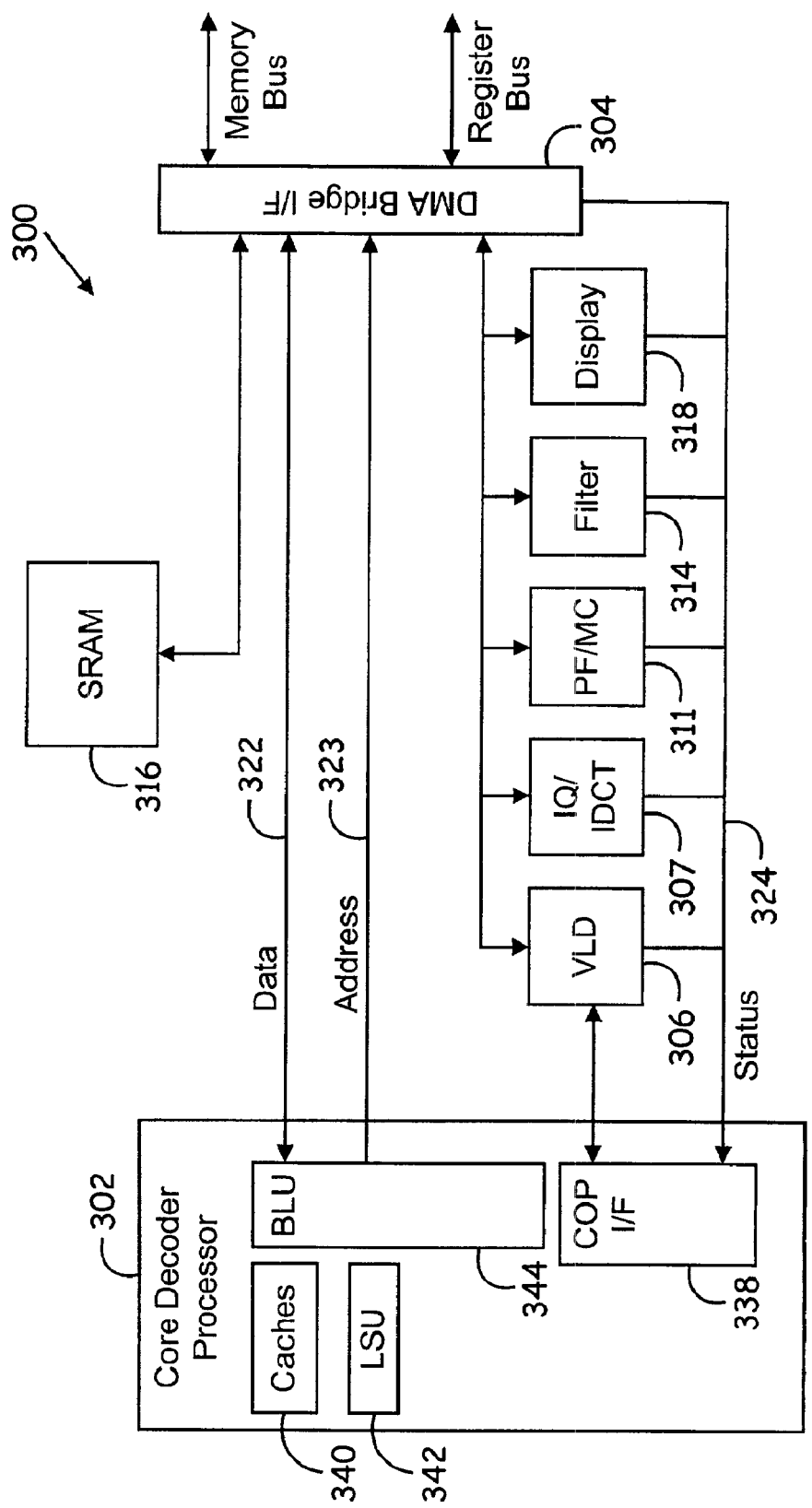
FIG. 5 is a functional block diagram of a decoding system according to an illustrative embodiment of the present invention.

FIG. 5 is a functional block diagram showing the interfaces of the core decoder processor 302 to other blocks in decoding system 300 according to an illustrative embodiment of the present invention. In FIG. 5, elements that are equivalent to elements in FIG. 3 are given the same reference numbers as their corresponding elements in FIG. 3. To achieve a higher performance level, the VLD 306 is directly connected to the core processor 302 through a fast coprocessor interface 338. VLD commands are sent to the VLD 306 from the core processor 302 with co-processor commands. Results and status are passed between the core processor 302 and the VLD 306 through move instructions and copy instructions.

The DMA block 304 is in charge of routing requests between blocks in the decoder processor 300. Decoder processor memory accesses are performed through the bus interface unit (BIU) 344 of the decoder processor 302 and DMA block 304. The core processor 302 is also in charge of issuing memory requests to move data between the decoder memory 316 and the main memory 110.

The core decoder processor 302 includes load store unit (LSU) 342 that processes all types of load (read) and store (write) requests. The bus interface unit 344 processes all memory accesses. One or two data buffers are installed in BIU 344 for buffering incoming and outgoing data between the core processor 302 and decoder memory 316 and system memory 110. As an example, a write buffer stages any memory bound data so that the core processor 302 need not wait until the store data are actually placed in the memory. Without such a buffer, in the case of cache misses and non-cacheable reads, the core processor 302 would be stalled until the data is returned.

Figure 6:
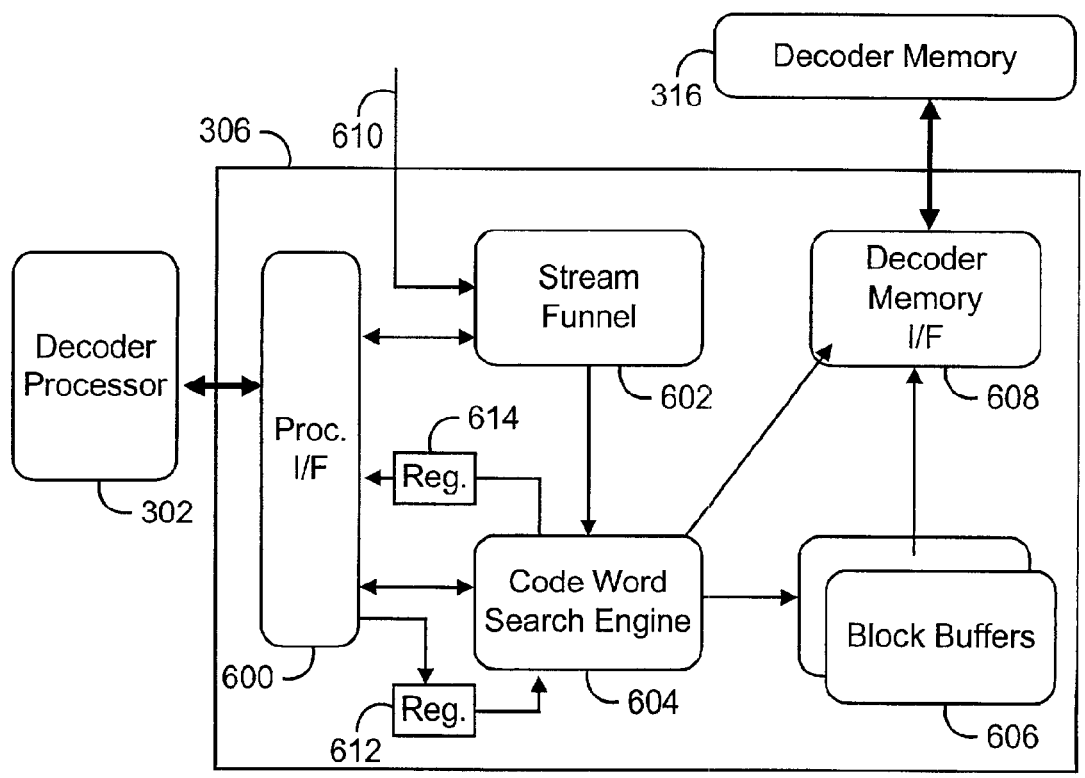
FIG. 6 is a functional block diagram representing a variable-length decoding system according to an illustrative embodiment of the present invention.

FIG. 6 is a functional block diagram representing a variable-length decoding system 306 according to an illustrative embodiment of the present invention. In FIG. 6, elements that are also shown in FIGS. 3 and 5 are given like reference numbers. The VLD 306 includes decoder processor interface 600, stream funnel 602, codeword search engine 604, block buffer 606, decoder memory interface 608, code table selection register 612 and status register 614.

The input 610 to the VLD 306 is a bit stream without explicit word boundaries. The VLD 306 decodes a codeword, determines its length, and shifts the input data stream by the number of bits corresponding to the decoded code length, before decoding the next codeword. These are recursive operations that are not pipelined.

The VLD 306 is implemented based on a small, local, code table memory unit, located in codeword search engine 604, that stores programmable Huffman coded tables. In an illustrative embodiment, the local memory unit is a random access memory (RAM) unit. A small code table memory unit is achieved by employing a multistage search structure that reduces the storage requirement, enables fast bit extraction and efficiently handles the case of a large number of code tables.

The stream funnel 602 receives data from the source (or coded buffer) and shifts the data according to the previously decoded code length, so as to output the correct window of bits for the symbols that are being currently decoded. In an illustrative embodiment, the stream funnel receives the incoming bitstream 610 from system memory 110.

The codeword search engine 604 mainly behaves as a symbol search engine. The codeword search engine is based on a multistage search structure. Since codewords are assigned based on the probability of appearance, the shortest codeword is assigned to the most frequent appearance. The multistage search structure is based on this concept. The codeword search engine 604 incorporates a small code memory that is employed for performing pattern matching. A multistage, pipelined structure is employed to handle the case of a long codeword. Additionally, a code table reduction algorithm can further reduce the storage requirement for a large number of code tables.

Status register 614 is adapted to hold an indicator of the status of the VLD 306. The status register is accessible by the core decoder processor 302 to determine the status of VLD 306. In an illustrative embodiment, the status register 614 indicates whether or not the VLD has completed its variable-length decoding functions on the current macroblock.

Code table selection register 612 is adapted to hold a value that dictates which of a plurality of VLD code tables is to be utilized to decode variable-length code. In an illustrative, code table selection register 612 holds the starting address of the code table to be employed. The code table selection register 612 is programmable to dictate the appropriate code table to be employed according to the format of an incoming data stream. In an illustrative embodiment, the core video processor 302 provides a value (an address, for example) to register 612 to point to the code table that is appropriate for the current data stream. The code tables can be switched on a macroblock-to-macroblock basis.

Figure 7:
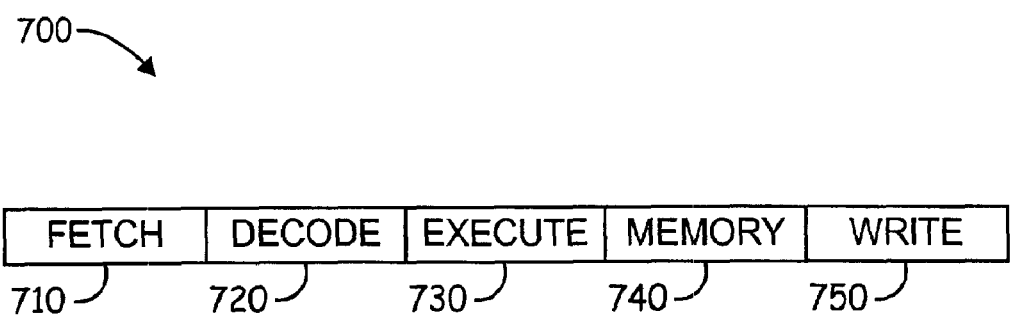
FIG. 7 is an chart showing a core processor instruction pipeline according to an illustrative embodiment of the present invention.

In an illustrative embodiment of the present invention, the core processor 302 is based on a five-stage instruction pipeline 700, as shown in FIG. 7. The five stages of the core processor pipeline are instruction fetch stage 710, instruction decode stage 720, instruction execute stage 730, memory access stage 740 and write-back stage 750.

Referring again to FIG. 5, the VLD 306 is directly connected to the core processor 302 through a co-processor interface 338 and the VLD module 306 is architected as a co-processor to the decoder processor 302. That is, the VLD 306 can operate on a single-command basis where the core processor 302 issues a command (via a co-processor instruction) and waits (via a move-from-co-processor instruction) until it is executed by the VLD 306, without polling the status register 614 of VLD 306 to determine completion of the command. In an illustrative embodiment, the core processor 302 makes available a co-processor usability bit in a system control status register to activate the co-processor. The core processor 302 recognizes co-processor instructions and passes them to the VLD 306 to execute. In an illustrative embodiment, for co-processor instructions that move data between the registers in the VLD 306 and the general registers in the core processor 302, the pipeline control in the core processor 302 will stall the instruction pipeline 700 when the data are not ready in the VLD 306.

In general, there are two types of co-processor instructions: i) instructions issued at the core processor 302 but executed completely at the VLD 306, and ii) instructions that move data between the core processor 302 and the VLD 306. Instructions of type i) will be called co-processor commands in this document. The core processor 302 sends co-processor commands to the VLD 306 directly so that a certain task can be performed. The VLD 306 decodes individual co-processor commands before execution. Instructions of type ii) include move-to-coprocessor (MTC) instructions, which cause data to be written from the core processor 302 to the VLD, and move-from-co-processor (MFC) instructions which causes the core processor 302 to read data from the VLD 306.

In an illustrative embodiment of the present invention, all VLD co-processor instructions, including co-processor commands, MFC instructions and MTC instructions, are all dispatched by the core processor 302 to the VLD 306 at the memory access 730 stage of the core processor pipeline of FIG. 7. This is to avoid the ambiguity that would occur if a later issued instruction arrived at VLD 306 before an earlier one. Also, if a VLD instruction were already dispatched before the memory access stage 730, then an interrupt could cancel the instruction and cause re-issuance of the same instruction and therefore confusion to VLD 306.

In an illustrative embodiment of the present invention, VLD 306 includes two variable-length decoder units, $VLD_0$ and $VLD_1$. Illustratively one of the variable-length decoder units is a programmable unit having a code RAM and the other is hard-coded to decode bitstreams according to a particular decoding standard. In this embodiment, the core processor 302 can only issue commands to one of the variable-length decoder units at a time. The active VLD is determined by the value of a VLD control register. In an exemplary embodiment, when the control register has a value 0, all VLD instructions are sent to $VLD_0$. The value in the control register is changed by a copy-control-to instruction and can be read by a copy-control-from instruction. For the rest of this discussion, the VLD 306 is referred to as the active VLD under the current control register value.

Figure 8:
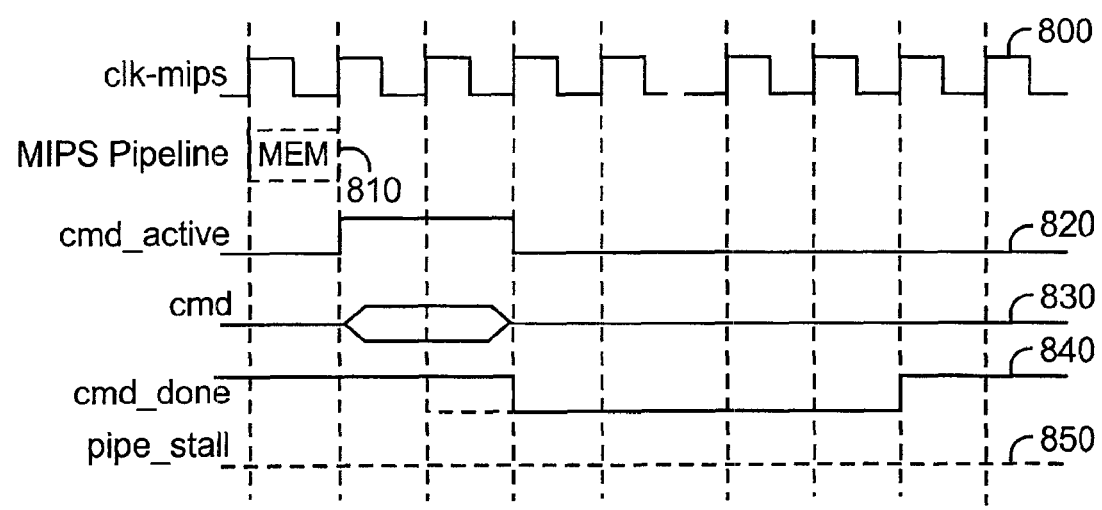
FIG. 8 is a timing diagram depicting the timing related to the issuance of a variable-length decoding command instruction by the core processor.

FIG. 8 is a timing diagram depicting the timing related to the issuance of a VLD command instruction by the core processor 302. FIG. 8 shows the timing of the core processor clock 800, the core processor instruction pipeline 810, command-active signal 820, the execution of the command 830, command-done signal VLD 840 and pipeline-stall signal 850. Commands are sent to VLD 306 at the end of the core processor's 302 instruction memory access stage and are present at the interface of VLD 306 after one core processor clock cycle, as shown in FIG. 8.

In the illustrative embodiment wherein the VLD 306 runs at half the speed of the core processor 302, the command execution and the command-active signal last, at most, two core processor clock cycles, as can be seen in FIG. 8. The command-done signal goes low initially to indicate that the command issued is received by VLD 306. This can be one or two core processor clock cycles later than the command-active signal, depending on which core processor clock edge that the VLD clock edge aligns up to.

On receiving a VLD command, the VLD 306 performs the task the command dictates and sets the command-done signal high again to indicate the completion of the command by VLD 306. The command-done signal can only be cleared by a subsequent co-processor command issued by the core processor 302. In illustrative embodiment of the present invention, the core processor pipeline will never be stalled by a VLD command instruction. But, as explained later, other VLD instructions (namely MFC and MTC) may stall the pipeline.

The VLD 306 is capable of executing a variety of commands issued by the core processor, including, but not limited to, variable-length decode, get bits, grab bits, start code search, download code table (from main memory 110), transfer data to main memory 110, and VLD block decode. During the execution of a command, no new commands will be accepted by the VLD 306. Therefore, before issuing new commands, the core processor 302 checks to see if an earlier issued command is finished by polling (MFC read instruction) the command status 614 register in VLD 306 that generates the command-done signal. In an illustrative embodiment, once a command is issued, it cannot be interrupted or stopped.

Figure 9:
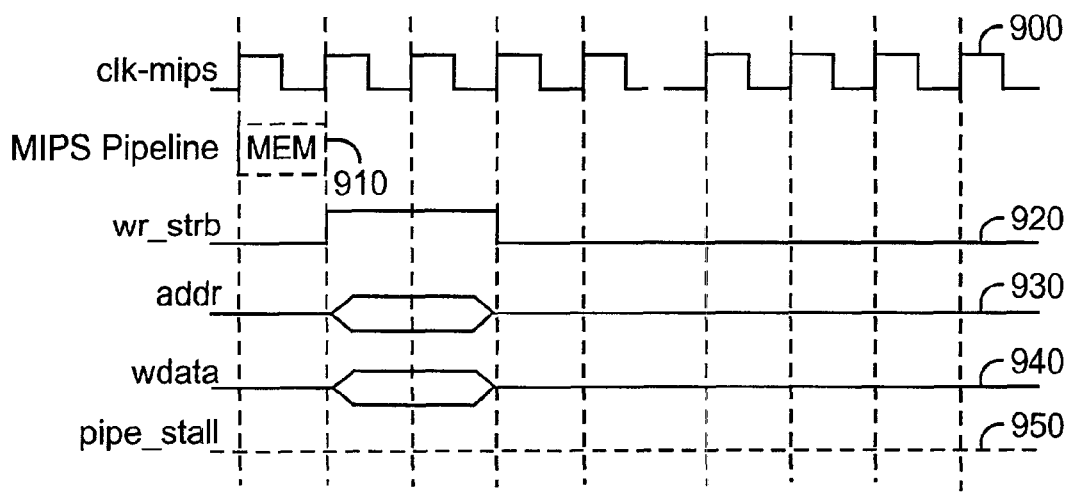
FIG. 9 is a timing diagram depicting the timing related to the issuance of a move-from-coprocessor instruction by the core processor.

The move-to-co-processor (MTC) instruction is a register write instruction that is used by the core processor 302 to load the contents of a register residing in the core processor 302 to a register in the VLD 306. The timing protocol between the VLD 306 and the core processor's co-processor interface 338 is demonstrated in FIG. 9. FIG. 9 shows the timing of the core processor clock 900, the core processor instruction pipeline 910, register write strobe 920, the address 930 of the VLD register to be written to, the execution of the write operation 940 and pipeline-stall signal 950. In the protocol, the write strobe 920, address 930 and write data 940 signals constitute the interface. With this protocol, the core processor 302 does not stall its instruction pipeline 700. Furthermore, the protocol requires that the interface signals last no more than two core processor clock cycles. Consecutive MTC and VLD command instruction combinations may need insertion of NOP (No Operation) instructions in between as will be described later in this document.

The move-from-co-processor (MFC) instruction is a register read instruction used by the core processor 302 to load a VLD register to a core processor register. There are many registers in VLD 306 that the core processor 302 may need to read. One such register is status register 614. The move-from-coprocessor instruction includes a "wait" bit. The move-from-coprocessor instruction behaves differently with respect to reading a VLD register depending on the value of the wait bit.

In the illustrative embodiment wherein the VLD 306 runs at half the speed of the core processor 302, a move-from-coprocessor command uses at least two core processor clock cycles for the VLD to return the read result. Therefore, in an illustrative embodiment, a move-from-co-processor instruction stalls the core processor pipeline 700 by two core processor clock cycles.

One use of the move-from-coprocessor instruction is the reading of a snapshot value of a register or simply reading back a previously programmed register for verification. In this case, the core processor needn't wait for the command to be completed before reading the source register. In such a case, the wait bit will be low, for example. When the wait bit is low, read results are instantly returned to the core processor 302 without considering whether the data that is being read is updated, or whether the data is valid. MIPS will get the read data instantly (of course there is the fixed one or two clock cycle delay).

Figure 10:
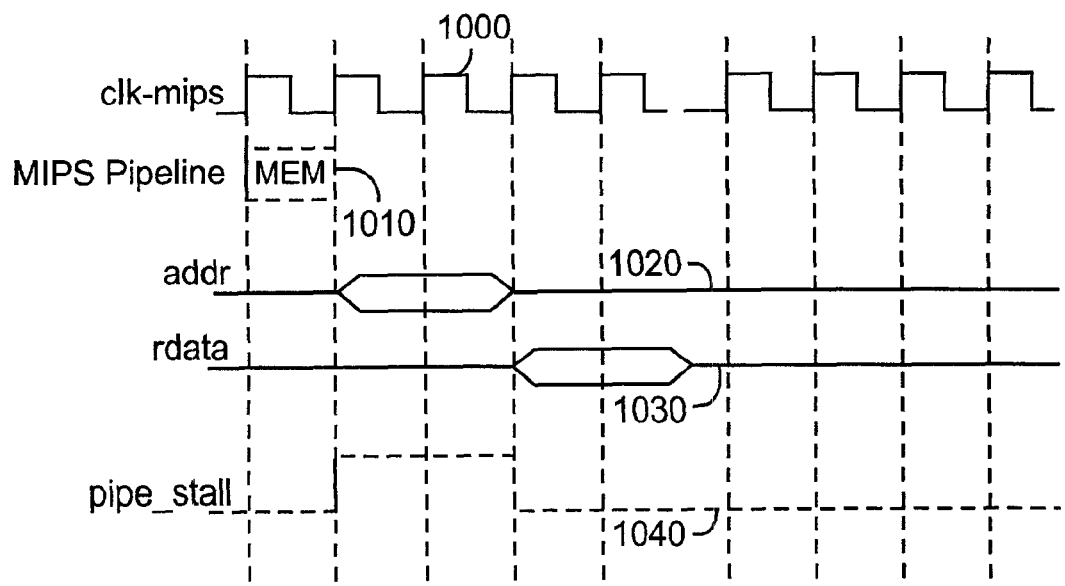
FIG. 10 is a timing diagram depicting the timing related to the issuance of a move-to-coprocessor instruction by the core processor.

FIG. 10 is an exemplary timing diagram depicting the timing related to the issuance of a move-from-coprocessor instruction by the core processor 302. FIG. 10 shows the timing of the core processor clock 1000, the core processor instruction pipeline 1010, the address 1020 of the VLD register to be written to, the execution of the read operation 1030 and pipeline-stall signal 1040. FIG. 10 shows the timing when the wait bit is low. Therefore, the delay in reading the data 1030 is only two core processor clock cycles (the fixed delay).

Another use of the move-from-coprocessor instruction is the reading of results of a previously issued VLD command or the status of the VLD 306. In this case, a previously issued command may not have finished, in which case its results would not be valid and the core processor waits for the command to be completed before reading the source register. Therefore, in an illustrative embodiment, when the wait bit is set, the move-from-coprocessor instruction will not finish its operation, or will wait, until the data to be read is updated and becomes valid. This is done by checking the command-done flag in the VLD 306 and finishing the read when the VLD 306 is done with its current task.

Figure 11:
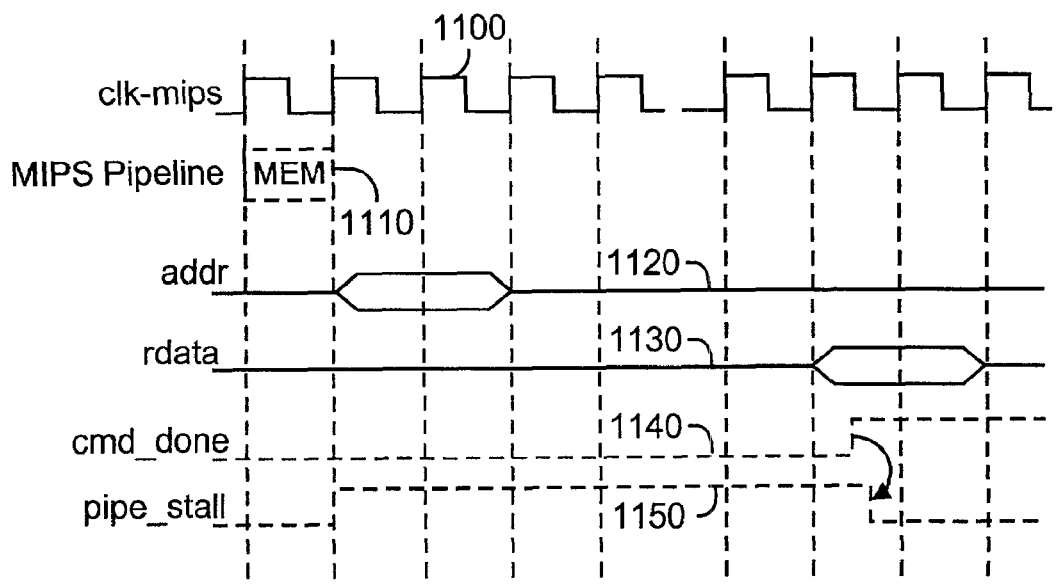
FIG. 11 is a timing diagram depicting the timing related to the issuance of a move-to-coprocessor instruction by the core processor.

FIG. 11 is an exemplary timing diagram depicting the timing related to the issuance of a move-from-coprocessor instruction by the core processor 302. FIG. 11 shows the timing when the wait bit is high. FIG. 11 shows the timing of the core processor clock 1100, the core processor instruction pipeline 1110, the address 1120 of the VLD register to be written to, the execution of the read operation 1130, command-done signal 1140 and pipeline-stall signal 1150. As can be seen in FIG. 11, the read operation 1130 is not completed until the core processor 302 sees that the command-done flag 1140 is set.

In an illustrative embodiment of the present invention, the move-from-coprocessor instruction also includes a "bank" bit. The bank bit is an extension to the address bits in the MFC instruction. The bank bit is an additional address bit (the most significant bit) that is employed when there are more registers than the original address bits can support.

The co-processor interface 338 of the core processor 302 is responsible for MFC register decoding. Therefore, the co-processor interface 338 provides the appropriate stall control for core processor pipeline. MFC instructions can be consecutive with pipeline stalls between them.

Referring again to FIG. 5, picture-level processing, from the sequence level down to the macroblock level, including the sequence headers, picture headers, time stamps, and buffer management, are performed directly and sequentially by the core processor 302. The VLD 306 assists the core processor when a bit-field in a header is to be decoded. Picture level processing does not overlap with slice level (macroblock) decoding.

The macroblock level decoding is the main video decoding process. It occurs within a direct execution loop. In an illustrative embodiment of the present invention, hardware blocks VLD 306, IQ/IDCT module 307, pixel filter/motion compensation module 311 (and possibly deblocking filter 314) are all involved in the decoding loop. The core processor 302 controls the loop by polling the status of each of the hardware blocks involved.

Figure 12:
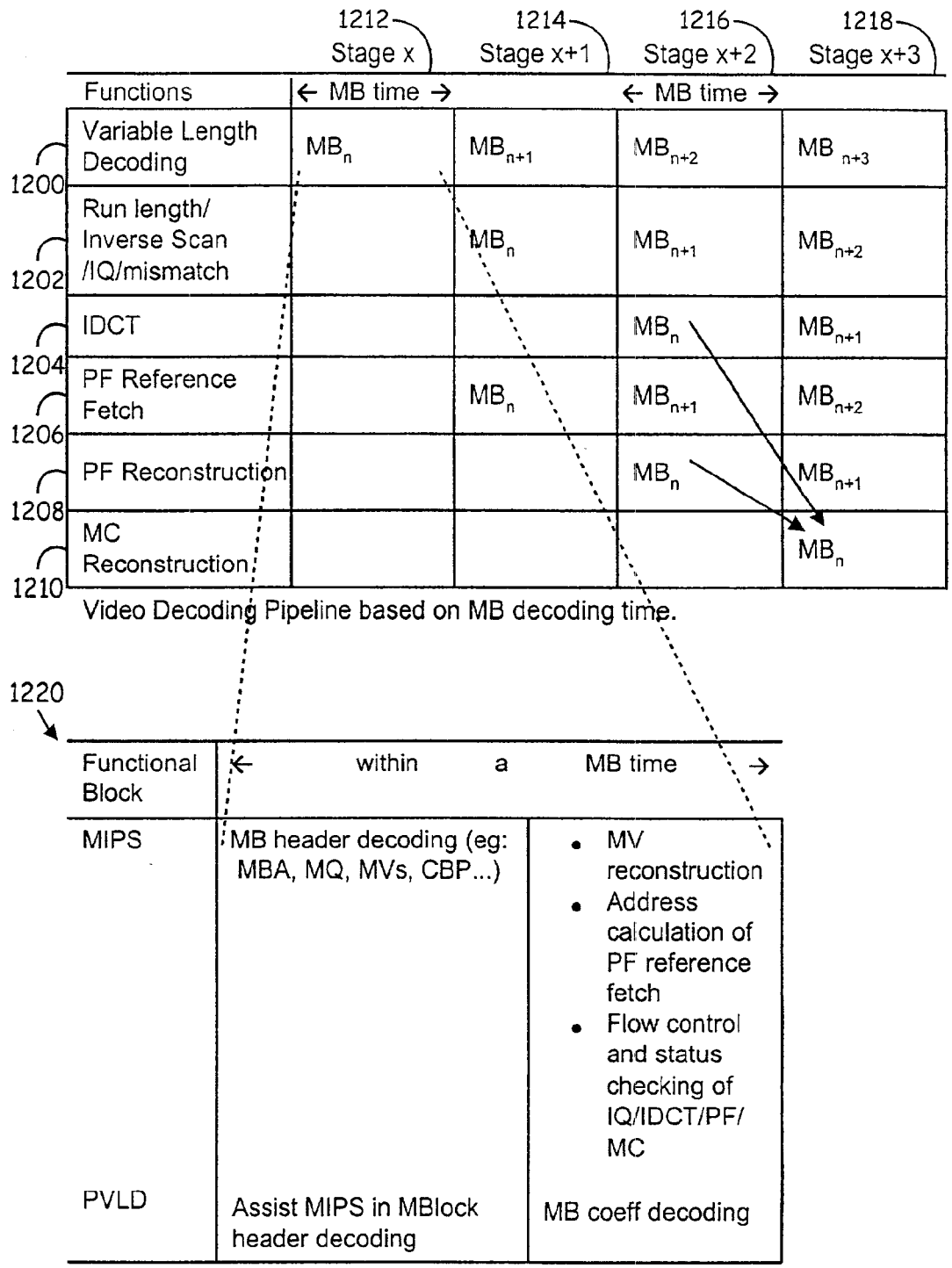
FIG. 12 is a chart representing a decoding pipeline according to an illustrative embodiment of the present invention.

In an illustrative embodiment of the present invention, the actions of the various hardware blocks are arranged in an execution pipeline. The pipeline scheme aims to achieve maximum utilization of the core processor 302. FIG. 12 is a chart representing a decoding pipeline according to an illustrative embodiment of the present invention. The number of pipeline stages may vary depending on the target applications. Due to the selection of hardware elements that comprise the pipeline, the pipeline architecture of the present invention can accommodate substantially any existing or future compression algorithms that fall into the general class of DCT-based, variable-length coded, block-motion compensated algorithms.

The rows of FIG. 12 represent the decoding functions performed as part of the pipeline according to an exemplary embodiment. Variable-length decoding 1200 is performed by VLD 306. Run length/inverse scan/IQ/mismatch 1202 are functions performed by IQ module 308. IDCT operations 1204 are performed by IDCT module 309. Pixel filter reference fetch 1206 and pixel filter reconstruction 1208 are performed by pixel filter 310. Motion compensation reconstruction 1210 is performed by motion compensation module 312. The columns of FIG. 12 represent the pipeline stages. The designations $MB_n$, $MB_{n+1}$, $MB_{n+2}$, etc. represent the $n^{th}$ macroblock in a data stream, the $n+1^{st}$ macroblock in the data stream, the $n+2^{nd}$ macroblock, and so on. The pipeline scheme supports one pipeline stage per module, wherein any hardware module that depends on the result of another module is arranged in an immediately following MB pipeline stage.

At any given stage in the pipeline, while a given function is being performed on a given macroblock, the next macroblock in the data stream is being worked on by the previous function in the pipeline. Thus, at stage x 1212 in the pipeline represented in FIG. 12, variable-length decoding 1200 is performed on $MB_n$. Exploded view 1220 of the variable-length decoding function 1200 demonstrates how functions are divided between the core processor 302 and the VLD 306 during this stage, according to one embodiment of the present invention. Exploded view 1220 shows that during stage x 1212, the core processor 302 decodes the macroblock header of $MB_n$. The VLD 306 assists the core processor 302 in the decoding of macroblock headers. The core processor 302 also reconstructs the motion vectors of $MB_n$, calculates the address of the pixel filter reference fetch for $MB_n$, performs pipeline flow control and checks the status of IQ module 308, IDCT module 309, pixel filter 310 and motion compensator 312 during stage x 612. The hardware blocks operate concurrently with the core processor 302 while decoding a series of macroblocks. The core processor 302 controls the pipeline, initiates the decoding of each macroblock, and controls the operation of each of the hardware accelerators. The core processor firmware checks the status of each of the hardware blocks to determine completion of previously assigned tasks and checks the buffer availability before advancing the pipeline. Each block will then process the corresponding next macroblock. The VLD 306 also decodes the macroblock coefficients of $MB_n$ during stage x. Block coefficient VLC decoding is not started until the core processor 302 decodes the whole macroblock header. Note that the functions listed in exploded view 1220 are performed during each stage of the pipeline of FIG. 12, even though, for simplicity's sake, they are only exploded out with respect to stage x 1212.

At the next stage x+1 1214, the inverse quantizer 308 works on $MB_n$ (function 1202) while variable-length decoding 1200 is performed on the next macroblock, $MB_{n+1}$. In stage x+1 1214, the data that the inverse quantizer 308 work on are the quantized DCT coefficients of $MB_n$ extracted from the data stream by the VLD 306 during stage x 1212. In an exemplary embodiment of the present invention, also during stage x+1 1214, the pixel filter reference data is fetched for $MB_n$ (function 1206) using the pixel filter reference fetch address calculated by the core processor 302 during stage x 612.

Then, at stage x+2 1216, the IDCT module 309 performs IDCT operations 1204 on the $MB_n$ DCT coefficients that were output by the inverse quantizer 308 during stage x+1. Also during stage x+2, the pixel filter 310 performs pixel filtering 1208 for $MB_n$ using the pixel filter reference data fetched in stage x+1 1214 and the motion vectors reconstructed by the core processor 302 in stage x 1212. Additionally at stage x+2 1216, the inverse quantizer 308 works on $MB_{n+1}$ (function 1202), the pixel filter reference data is fetched for $MB_{n+1}$ (function 1206), and variable-length decoding 1200 is performed on $MB_{n+2}$.

At stage x+3 1218, the motion compensation module 312 performs motion compensation reconstruction 1210 on $MB_n$ using decoded difference pixel information produced by the IDCT module 309 (function 1204) and pixel prediction data produced by the pixel filter 310 (function 1208) in stage x+2 1216. Also during stage x+3 1218, the IDCT module 309 performs IDCT operations 1204 on $MB_{n+1}$, the pixel filter 310 performs pixel filtering 1208 for $MB_{n+1}$, the inverse quantizer 308 works on $MB_{n+2}$ (function 1202), the pixel filter reference data is fetched for $MB_{n+2}$ (function 1206), and variable-length decoding 1200 is performed on $MB_{n+3}$. While the pipeline of FIG. 12 shows just four pipeline stages, in an illustrative embodiment of the present invention, the pipeline includes as many stages as is needed to decode a complete incoming data stream.

The main video decoding operations occur within a direct execution loop with polling of the accelerator functions. The coprocessor/accelerators operate concurrently with the core processor while decoding a series of macroblocks. The core processor 302 controls the pipeline, initiates the decoding of each macroblock, and controls the operation of each of the accelerators. Upon completion of each macroblock processing stage in the core processor, firmware checks the status of each of the accelerators to determine completion of previously assigned tasks. In the event that the firmware gets to this point before an accelerator module has completed its required tasks, the firmware polls for completion. When the core processor 302 and all of the hardware accelerators have completed their functions with respect to the present macroblocks, the core processor initiates the next stage of the pipeline by instructing all of the accelerators to begin operating on the next macroblock in the pipeline. This is appropriate, since the pipeline cannot proceed efficiently until all of the pipeline elements have completed the current stage, and an interrupt driven scheme would be less efficient for this purpose.

Each hardware module 306, 308, 309, 310, 312, 313, 315 is independently controllable by the core processor 302. The core processor 302 drives a hardware module by issuing a certain start command after checking the module's status. In one embodiment, the core processor 302 issues the start command by setting a register in the hardware module.

Figure 13:
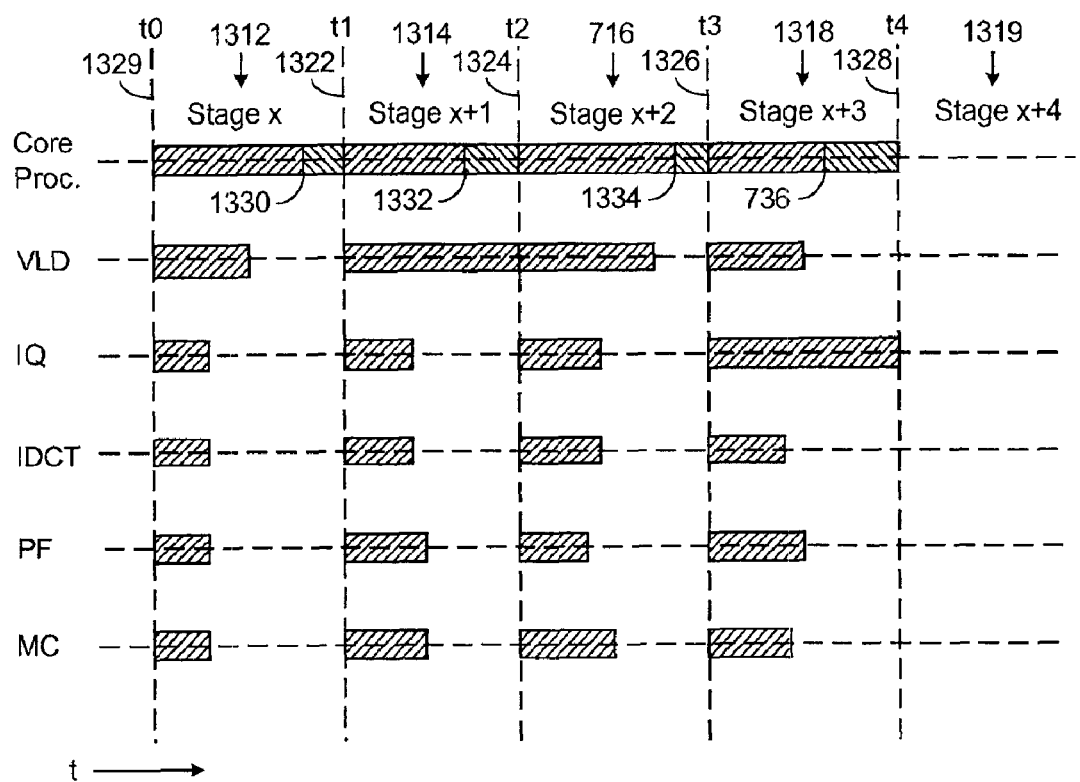
FIG. 13 is a chart representing a decoding pipeline according to an illustrative embodiment of the present invention.

The macroblock-level pipeline shown in FIG. 12 advances stage-by-stage. FIG. 13 is a chart representing a decoding pipeline according to an illustrative embodiment of the present invention. The rows of FIG. 13 represent the hardware modules that comprise the decoding pipeline according to an exemplary embodiment of the present invention. FIG. 13 shows a decoding pipeline that is full, i.e., each of the decoding functions are operating on macroblock data. The solid horizontal bars corresponding to each hardware module represent how long each hardware module is active for each stage of a hypothetical decoding pipeline. The pipeline of FIG. 13 is hypothetical and is merely used to demonstrate the pipeline timing; the actual time a given function takes in a given stage depends on the characteristics of the bitstream. As can be seen in FIG. 13, the pipeline advances after all the tasks in the current stage are completed. The time elapsed in one macroblock pipeline stage will be referred to herein as the macroblock (MB) time. The MB time is not a constant and varies from stage to stage. It depends on the encoded bitstream characteristics and is determined by the bottleneck module, which is the one that finishes last in that stage. Any module, including the core processor 302 itself, can be the bottleneck from stage to stage and it is not pre-determined at the beginning of each stage.

In stage x 1312 of the hypothetical pipeline of FIG. 13, the core processor 302 is the last module to complete its tasks for that stage, which it does at point 1330. After the core processor 302 completes its tasks for stage x at point 1330, there is a short time period wherein the core processor 302 checks the other modules to see if they have completed their tasks for the stage and then directs the other modules to begin the next stage, that is, to begin processing their respective next macroblocks in the pipeline.

The next stage x+1 1314 begins at time $t_1$ 1322. In stage x+1, the core processor 302 completes its tasks at point 1332. The core processor 302 then begins checking the other modules for completion and finds that the VLD 306 is still decoding block coefficients for its current macroblock. Thus the core processor 302 continues polling the VLD 306 for completion. When the VLD 306 finishes its tasks, the core processor 302 discovers this condition and directs all modules to begin stage x+2 1316 operations on the appropriate macroblock data at time $t_2$ 1324.

In stage x+2 1316, the core processor 302 finishes performing its operations on the relevant macroblock data at point 1334. The core processor then polls the other modules. Finding that all of the other modules have completed their tasks for stage x+2 1316, the core processor initiates stage x+3 1318 at time $t_3$ 1326.

In stage x+3 1318, the inverse quantizer 308 is the last module to complete its operations, at time $t_4$ 1328. Thus the core processor 302 initiates stage x+4 1319 at time $t_4$ 1328. In an illustrative embodiment of the present invention, the bottleneck time for each stage is reduced by means of firmware control, improving the throughput and directly contributing to performance enhancement. The pipeline timing demonstrated in FIG. 13 can be implemented in any type of decoding scheme (including, e.g., audio decoding) employing any combination of acceleration modules.

Figure 14:
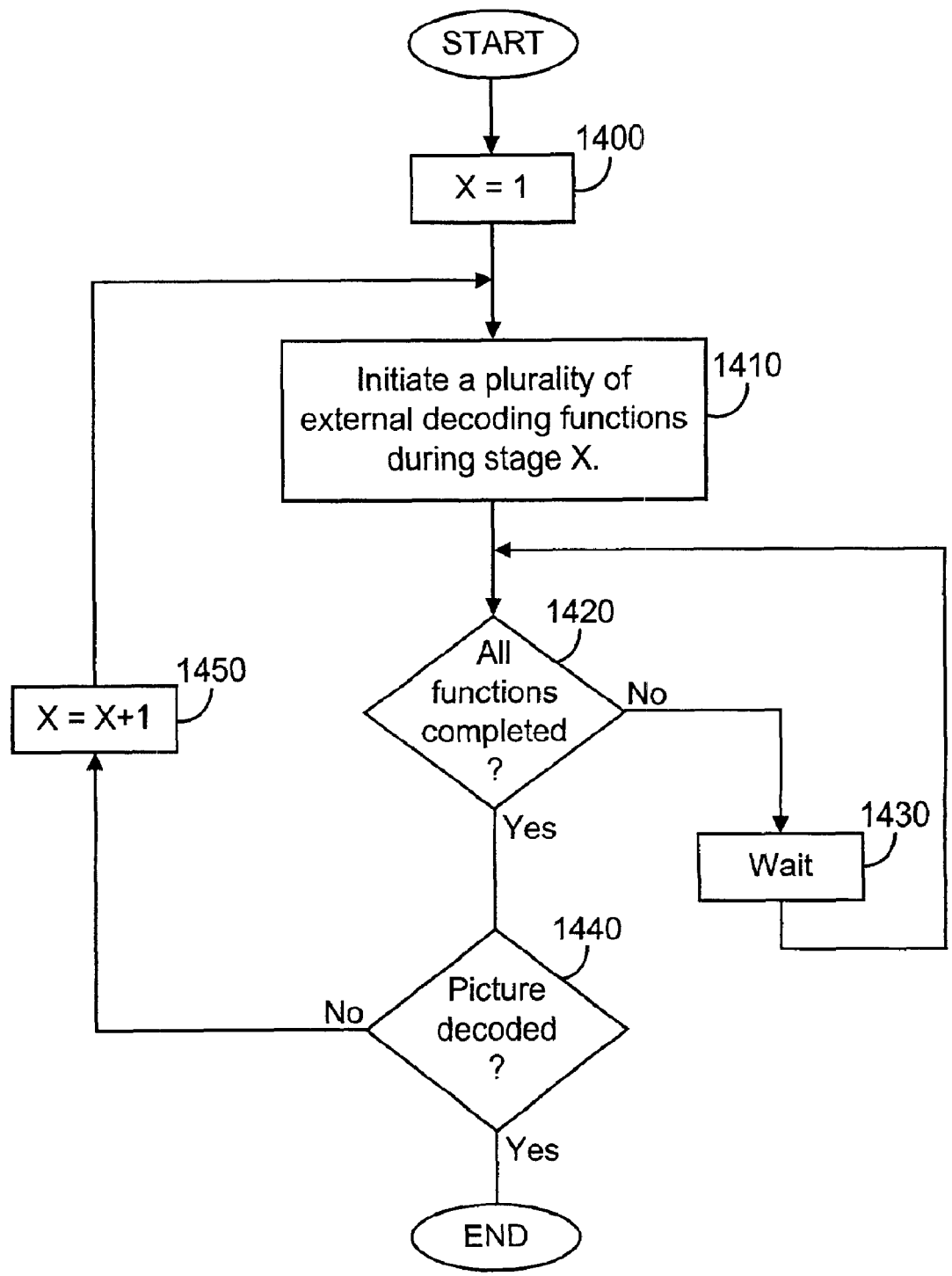
FIG. 14 is a flowchart representing a macroblock decoding loop according to an illustrative embodiment of the present invention.

FIG. 14 is a flowchart representing a method of decoding one picture of a video sequence according to an illustrative embodiment of the present invention. At step 1400, x is 1, indicating stage 1. At step 1410, the core processor 302 initiates a plurality of decoding functions during stage x. At decision box 1420, it is queried whether all of the decoding functions are completed. If one or more decoding functions are still being performed, the core processor 302 waits, as shown at step 1430, and then again checks the status of the modules at decision box 1420. The core processor 302 continues checking the status of the modules until all of the functions are completed. When all of the decoding functions are completed, it is determined whether decoding of the current picture is complete, as shown by decision box 1440. If the picture is decoded, the process of decoding the picture is complete. If data from a subsequent picture is in the pipeline, the process of FIG. 14 will be repeated for that picture. If, at decision box 1440, decoding of the current picture is not finished, x is incremented, as shown at step 1450, to indicate that the next stage is being entered. The decoding functions are initiated for the new stage, as shown at step 1410.

In an illustrative embodiment of the present invention, the core processor 302 instructs the VLD 306 to commence its operations for a given pipeline stage via the co-processor interface 338, as described previously with respect to FIGS. 5–11. In a further illustrative embodiment, the core processor 302 instructs the other accelerators 308, 309, 310, 312, 313 and 315 to commence their operations for a given pipeline stage by issuing posted command writes to the accelerators. A posted write is an action wherein the core processor 302 writes a command to an accelerator via a mechanism that allows the core processor 302 to continue on immediately to some other function, as though the write to the accelerator were completed immediately, but wherein the actual write to the accelerator occurs some number of clock cycles later. This is valuable since it minimizes the number of clock cycles the core processor 302 spends controlling the accelerators, while simultaneously allowing the implementation to have a register pipeline of arbitrary depth, thereby facilitating high clock rates and potentially complex or large architectures. In an illustrative embodiment, after initiating the actions of the accelerators 308, 309, 310, 312, 313, 315 via the posted write operation, the core processor proceeds to perform its own decoding tasks for that stage on the appropriate macroblock data. When the core processor 302, completes its functions for the stage, it polls the accelerators to determine if they have all completed the tasks commanded by the core processor via the posted write. In an illustrative embodiment, polling the accelerators involves checking a status bit, flag or register in each of the accelerators. If a given accelerator is not done with its operations for the present stage, the core processor continues to poll that accelerator until the accelerator is done with its tasks. When the core processor 302 finds that all modules have completed their functions, the core processor initiates the next pipeline stage, again driving the accelerators other than VLD 306 via posted writes.

Figure 15:
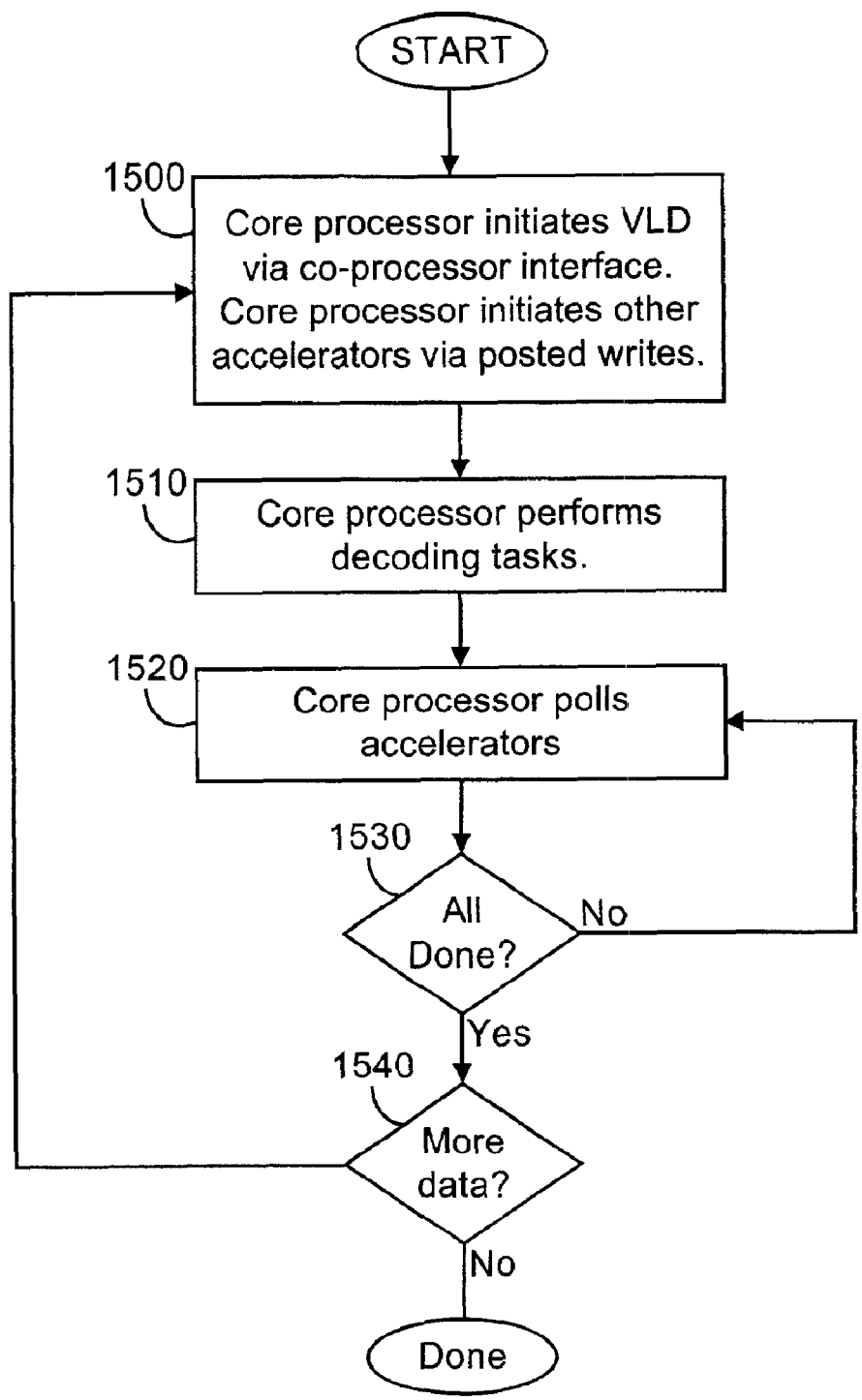
FIG. 15 is a flowchart representing a method of decoding a data stream according to an illustrative embodiment of the present invention.

FIG. 15 is a flowchart representing how the core processor 302 controls the decoding pipeline according to an illustrative embodiment of the present invention. At step 1500, the core processor 302 instructs the accelerators to perform their respective functions. The core processor instructs the VLD 306 to perform its operations via a command issued via the co-processor interface 338, as is described above with respect to FIGS. 5–8. The core processor instructs the other accelerators, such as inverse quantizer 308, IDCT module 309, pixel filter 310, motion compensation module 312, loop filter 313 and post filter 315, to perform their operations via posted command writes. At step 1510, after initiating the decoding functions, the core processor 302 performs its own decoding functions while the accelerators are performing their decoding functions. At step 1520, after the core processor completes its own decoding tasks, it polls the accelerators to determine if they have completed their decoding tasks. In an illustrative embodiment, the core processor 302 polls the VLD 302 by issuing a move-to-coprocessor instruction to the VLD 306 via the co-processor interface 338, indicating the status register 614 as the register to be read. In an illustrative embodiment, the core processor polls the other accelerators 308, 309, 310, 312, 313, 315 by reading a status register in each of the accelerators. In an alternative embodiment, the other accelerators 308, 309, 310, 312, 313, 315 share a status register residing in the co-processor interface 338 with the VLD 306, as will be described more fully below. At decision box 1530, if all of the accelerators, including the VLD 306, have completed their assigned tasks, the core processor determines if there is further data to be decoded in the pipeline, as shown by decision box 1540. If one or more of the accelerators at decision box 1530 have not completed their assigned tasks, the core processor again polls said accelerators that to see if they have completed their tasks, as shown by step 1520. The core processor 302 continues to poll the accelerators until it is determined that all of the accelerators have completed their functions. At decision box 1540, if there is further data to be decoded in the pipeline, the core processor 302 instructs the accelerators to perform their respective functions, as shown by step 1500. This constitutes the beginning of the next stage, wherein each of the accelerators works on the their respective next macroblocks in the data stream. If, at decision box 1540, there is no more data left to be decoded in the pipeline, the decoding pipeline is complete, until more data to be decoded is presented to the decoding system 300.

As mentioned above, in one embodiment of the present invention, the VLD 306 and the other accelerators 308, 309, 310, 312, 313, 315 share a status register residing in the co-processor interface 338 with the VLD 306. FIG. 5 shows that status data from each of the hardware modules 306, 307, 311, 314 and 318 are provided to co-processor interface 338. To poll the various accelerators for completion of their presently assigned tasks, the core processor 302 simply reads the contents of the shared status register in the co-processor interface 338. Each accelerator module 306, 308, 309, 310, 312, 313, 315 directly reports to the shared status register. Each accelerator module is assigned a set of bits in a data word (in an illustrative embodiment, a 32-bit data word) that is read as "status register.". In an illustrative embodiment, the shared status register is a general purpose register (GPR) in the core processor 302. The general purpose register is indicated in the core processor instruction being executed. In an illustrative embodiment, the core processor 302 reads both status and error bits in the status register word. In this embodiment, when the core processor 302 executes a "read shared status register" instruction, all the accelerator modules report their status directly on the data bus, which will be read by the core processor 302 via the co-processor interface 338 into the shared status register in the core processor 302. In an illustrative embodiment, each of the accelerator modules responds to the same address but only reports (writes) selected (non-overlapping) bits on the data bus.

In an alternative embodiment of the present invention, individual status and error conditions of both the VLD 306 and the other accelerator modules 308, 309, 310, 312, 313, 315 are accessed by the core processor 302 through the read/write mechanism of the core processor 302. One usage scenario is the following: the core processor firmware causes the core processor 302 to execute an instruction to read all status/error bits from the hardware accelerators into one of the core processor's internal general purpose registers. If the firmware discovers there was an error in one of the modules, and the core processor firmware wants to know more about the particular error reported, then the actual hardware register from the hardware module (both VLD 306 and the other accelerators) must be read using the "normal" mapped-memory read/write mechanism.

Figure 16:
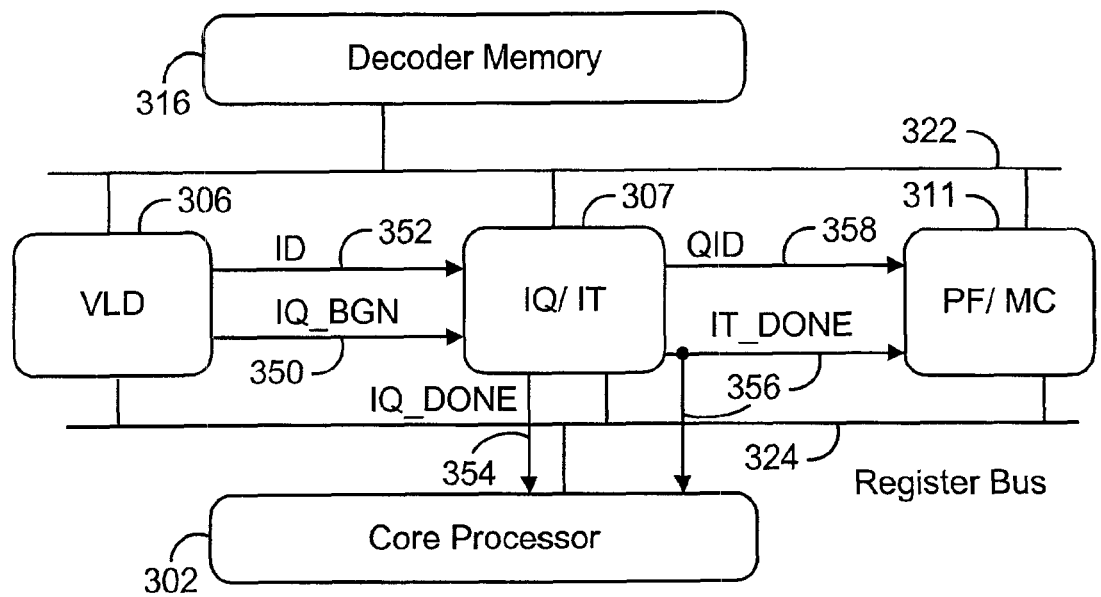
FIG. 16 is a functional block diagram representing a communication scheme between a variable-length decoder, an inverse quantizer/IDCT engine, a pixel filter/motion compensation module, a core processor and decoder memory according to an illustrative embodiment of the present invention.

FIG. 16 is a functional block diagram representing a communication scheme between VLD 306, inverse quantizer/IDCT engine 307, pixel filter/motion compensation module 311, core processor 302 and decoder memory 316 according to an illustrative embodiment of the present invention. The IQ/IDCT module 307 performs run-level decoding, inverse scan, inverse quantization and inverse transform operations. In an illustrative embodiment, the IQ/IDCT module 307 is designed to decode MPEG-2 HD streams, as well as other computationally intensive algorithms as required by the decoding system 300.

The IQ/IDCT module 307 consists of two major blocks: Inverse Quantization (IQ) and Inverse Transform (IT). The IQ block performs run-level decoding, inverse scan, inverse quantization, and mismatch control. The IT block performs inverse DCT and other inverse transform variants (e.g. linear transform) used in various decoding standards. It will be noted that in an alternative embodiment of the present invention, the decoding system 300 includes separate inverse quantizer 308 and IDCT 309 modules. In an illustrative embodiment of the present invention, the decoding process is performed by a combination of core processor firmware and hardware acceleration tasks. In the inverse transform case, for instance, MPEG-4's inverse DC & AC prediction, H263+ advanced INTRA coding mode and Microsoft's WMV lifting functions are handled by the core processor 302.

The IQ module starts in the "ready" state and waits for an IQ begin signal (IQ_BGN 350). When IQ begin signal 350 is high, it indicates that the VLD 306 has completed its operations and has transferred the resulting data to the macroblock buffer in decoder memory 316, and the IQ module is free to start to process the data that is located in the macroblock buffer pointed to by ID address 352. Each macroblock buffer is represented by a specific buffer ID which has been previously programmed by the core processor 302. ID address 352 indicates this address. In an illustrative embodiment, the ID address 352 is held in an IQ start address register in VLD 306. The IQ begin signal 350 is a pulse active for one system clock period.

In an alternative embodiment of the present invention, the core processor 302, not VLD 306, provides the IQ begin signal 350 to the IQ/IDCT. In that embodiment, the IQ start address register resides in the core processor 302. The core processor 302 will not issue the IQ begin signal 350 until the macroblock header, data (the output of the VLD 306), and commands in the decoder memory 316 are ready for IQ processing.

After IQ block detects the IQ begin signal 350, it generates decoder memory requests to the DMA/Bridge 304 based on the ID address 352 stored in the IQ start address register. The commands read from decoder memory 316 are subsequently decoded and executed by the IQ engine. The IQ done signal 354 signal is generated by the IQ engine when the IQ engine has completed its processing and has transferred the processed data to the macroblock buffer in decoder memory 316. After issuing the IQ done signal 354, the IQ block will go back to the "ready" state to wait for another command from the VLD 306 (or, in an alternative embodiment, from the core processor 302).

The IDCT done signal 356 signal is generated by the IDCT engine when the IDCT engine has completed its processing and has transferred the processed data to the macroblock buffer in decoder memory 316 indicated by QID address 358. After issuing the IDCT done signal 356, the IQ block will go back to the "ready" state to wait for another command from the VLD 306 (or, in an alternative embodiment, from the core processor 302).

The IQ/IDCT block hardware supports MPEG2, MPEG4, H263+ and Microsoft's WMV standards. In order to support other future standards, which may not be fully defined at this time, the IQ/IDCT is designed so that the core processor 302 can intervene in between the internal processing path. For example, if a particular decoding algorithm requires DC/AC prediction or lifting, the core processor 302 can take data that has been partially processed by the hardware and further process it as required.

Figure 17:
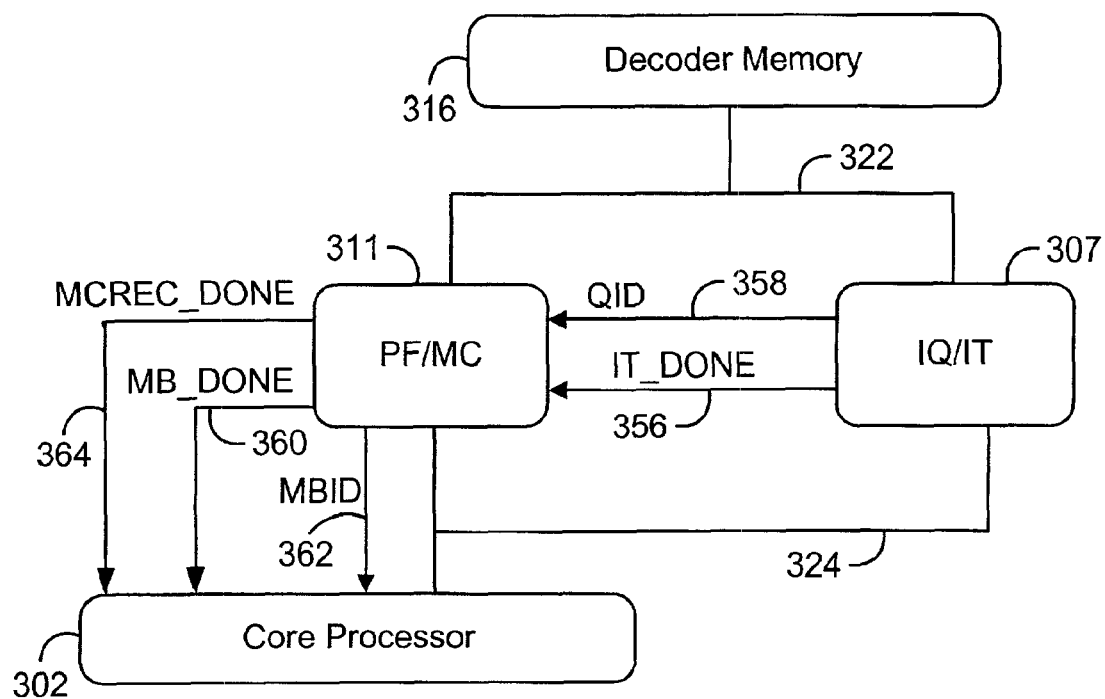
FIG. 17 is a functional block diagram representing a communication scheme between an inverse quantizer/IDCT engine, a pixel filter/motion compensation module, a core processor and decoder memory according to an illustrative embodiment of the present invention.

FIG. 17 is a functional block diagram representing a communication scheme between, inverse quantizer/IDCT engine 307, pixel filter/motion compensation module 311, core processor 302 and decoder memory 316 according to an illustrative embodiment of the present invention. It will be noted that in an alternative embodiment of the present invention, the decoding system 300 includes separate inverse quantizer 308 and IDCT 309 modules. IDCT_DONE signal 356 indicates when the IDCT block has completed its operation and has transferred the product data to the macroblock buffer in decoder memory 316. The duration of the IDCT_DONE signal 358 signal is illustratively one clock cycle. The QID signal 358 is the macroblock buffer ID. This signal is used to indicate to the PF/MC module 311 which macroblock in decoder memory 316 needs processing. In an illustrative embodiment, the QID address 358 is held in an PF/MC start address register in IQ/IDCT module 307.

A macroblock-buffer-done (MB_DONE) signal 360 indicates when the macroblock data that was produced by IDCT has been read into the MC module. The data in decoder memory can then be used for other purposes as indicated by the core 302 processor. The duration of the macroblock-buffer-done signal 360 is one clock cycle. A macroblock buffer ID (MBID) 362 indicates which macroblock data is being processed by PF/MC module 311. The actual address in decoder memory 316 is indexed by the value of this signal, and is programmed by the core processor 302 beforehand.

An MC done signal (MCREC_DONE) 364 indicates when the motion compensation block has completed its function and reconstructed data has been transferred to the macroblock buffer (indicated by MBID 362) in decoder memory 316. When motion compensation is done, the core processor 302 can issue a request to the Bridge DMA 304 to transfer the reconstructed data to main memory 110. Alternatively, at this time the post filter 315 is ready to process said macroblock data. The duration of the MC done signal 364 is one clock cycle.

In an alternative embodiment of the present invention, the core processor 302, not IQ/IDCT module 307, provides the IDCT_DONE signal 356 (or some similar signal indicating the PF/MC module can begin operating on the data in decoder memory 316) to the PF/MC module 311. In that embodiment, the PF/MC start address register resides in the core processor 302. The core processor 302 will not issue the IDCT_DONE signal 356 until the transformed coefficients (the output of the IQ/IDCT module 307) are ready for processing by the PF/MC module 311.

Although a preferred embodiment of the present invention has been described, it should not be construed to limit the scope of the appended claims. For example, the present invention is applicable to any type of data utilizing variable-length code, including any media data, such as audio data and graphics data, in addition to the video data illustratively described herein. Those skilled in the art will understand that various modifications may be made to the described embodiment. Moreover, to those skilled in the various arts, the invention itself herein will suggest solutions to other tasks and adaptations for other applications. It is therefore desired that the present embodiments be considered in all respects as illustrative and not restrictive, reference being made to the appended claims rather than the foregoing description to indicate the scope of the invention.

What is claimed is:

1. A decoding system comprising:
   a core decoder processor adapted to perform decoding functions on a coded data stream and adapted to issue commands to an entropy decoding accelerator; and
   an entropy decoding accelerator adapted to receive commands from the core decoder processor and to perform entropy decoding operations on entropy-coded code in the data stream in response to said commands, wherein the entropy decoding accelerator is adapted to provide a command status signal to the core decoder processor, the command status signal indicating whether or not a command is completed;
   wherein the core decoder processor is adapted to issue a register-read instruction to the entropy decoding accelerator that causes the contents of a register in the entropy decoding accelerator to be provided to the core decoder processor, wherein if the command status signal indicates that a previous command is not yet completed when a register-read instruction is issued by the core decoder processor, the contents of the register in the entropy decoder are not provided to the core decoder processor until the command status signal indicates that the previous command is completed.

2. The system of claim 1 wherein the entropy decoding accelerator comprises a command status register that indicates whether or not a command is completed and wherein the core decoder processor is adapted to poll the command status register to determine if the command is completed.

3. The system of claim 2 wherein the core decoder processor does not issue a new command to the entropy decoder accelerator unless the command status register indicates that a previous command is completed.

4. The system of claim 1 wherein the register-read instruction includes a wait bit, wherein if the wait bit is set and the command status signal indicates that a previous command is not yet completed when a register-read instruction is issued by the core decoder processor, the contents of the register in the entropy decoder are not provided to the core decoder processor until the command status signal indicates that the previous command is completed, but wherein if the wait bit is not set and a register-read instruction is issued by the core decoder processor, the contents of the register in the entropy decoder are provided to the core decoder processor regardless of the value of the command status signal.

5. The system of claim 1 wherein the core decoder processor is adapted to perform decoding functions on a coded media data stream and the entropy decoding accelerator is adapted to perform entropy decoding operations on entropy-coded code in the media data stream.

6. The system of claim 1 wherein the core decoder processor is adapted to perform decoding functions on a coded video data stream and the entropy decoding accelerator is adapted to perform entropy decoding operations on entropy-coded code in the video data stream.

7. The decoding system of claim 1 wherein the entropy decoding accelerator is a variable-length decoding accelerator adapted to perform variable-length decoding operations on variable-length code in the data stream in response to said commands.

8. The decoding system of claim 1 wherein the entropy decoding accelerator is adapted to perform entropy decoding operations on single-syntax elements in the data stream in response to said commands.

9. The decoding system of claim 1 wherein the entropy decoding accelerator is adapted to perform entropy decoding operations on complete blocks of syntax elements in the data stream in response to said commands.

10. The decoding system of claim 9 wherein the entropy decoding accelerator is adapted to concurrently perform entropy decoding operations on single-syntax elements and complete blocks of single-syntax elements in the data stream in response to said commands.

11. The decoding system of claim 1 wherein the entropy decoding accelerator is adapted to perform entropy decoding operations on single-syntax elements and on complete blocks of syntax elements in the data stream in response to said commands.

12. A method of controlling first and second decoding accelerators coupled to a core decoder processor adapted to decode a data stream, the first and second accelerators adapted to assist the core decoder processor with first and second decoding functions respectively, the method comprising:
   (a) providing, with the core decoder processor, first and second commands to the first and second accelerators respectively via posted write operations; and
   (b) polling the first and second accelerators with the core decoder processor to determine whether first and second operations, corresponding to the first and second commands respectively, have been performed by the first and second accelerators respectively.

13. The method of claim 12 wherein the first and second commands instruct the first and second accelerators to perform the first and second decoding functions and wherein polling step (b) comprises polling the first and second accelerators with the core decoder processor to determine whether the first and second decoding functions have been completed.

14. The method of claim 12 further comprising a step (c), performed after providing step (a) and prior to polling step (b), of performing a third decoding function with the core decoder processor.

15. The method of claim 12 wherein providing step (a) comprises:
   (a)(i) providing the first and second commands to an intermediate storage element; and
   (a)(ii) writing the first and second commands to the first and second accelerators when both the first and second accelerators are ready to receive the commands.

16. The method of claim 15 wherein step (a)(ii) is performed a plurality of core decoder clock cycles after step (a)(i) is performed.

17. The method of claim 12 further comprising a step (c), after step (b), of:
   (c) after the core decoder processor determines, via its polling of the first and second accelerators, that the operations corresponding to the first and second commands have been performed, providing, with the core decoder processor, third and fourth commands to the first and second accelerators, respectively, via posted write operations.

18. The method of claim 12 further comprising a step (c), after step (b), of:
   (c) after the core decoder processor determines, via its polling of the first and second accelerators, that the first and second operations have been performed by the first and second accelerators, providing, with the core decoder processor, third and fourth commands to the first and second accelerators respectively, via posted write operations.

19. The method of claim 18 wherein the second decoding function, performed by the second accelerator, depends on a product previously produced by the first decoding function, performed by the first accelerator.

20. A decoding system comprising:
- a core decoder processor adapted to perform decoding functions on a coded data stream and having a co-processor interface, the co-processor interface including a co-processor status register adapted to receive a status of a co-processor; and
- a first decoding accelerator adapted to assist the core decoder processor with a first decoding function and coupled to the core decoder processor via the co-processor interface, wherein the first decoding accelerator is adapted to provide status data indicative of a status of the first accelerator to the co-processor status register; and
- a second decoding accelerator adapted to assist the core decoder processor with a second decoding function, wherein the second decoding accelerator is adapted to provide status data indicative of a status of the second accelerator to the co-processor status register;
- wherein each of the first and second decoding accelerators are assumed a set of bit positions in the co-processor status register.

21. The system of claim 20 wherein the core decoder processor is adapted to issue commands to the first and second decoding accelerators and wherein the first and second decoding accelerators are adapted to provide status data indicative of whether a command is completed to the co-processor status register.

22. The system of claim 20 further comprising:
- a third decoding accelerator adapted to assist the core decoder processor with a third decoding function, wherein the third decoding accelerator is adapted to provide status data indicative of a status of the third accelerator to the co-processor status register.

23. The system of claim 20 further comprising:
- a data bus coupled to the co-processor interface and to the first and second decoding accelerators, wherein each of the first and second accelerators are adapted to provide status data to the bit positions of the data bus that correspond to the bit positions assigned each accelerator in the co-processor status register, and wherein the co-processor interface is adapted to read the contents of the data bus into the co-processor status register.

24. A decoding system comprising:
- a core decoder processor adapted to perform decoding functions on a coded data stream and having a co-processor interface, the co-processor interface including a co-processor status register adapted to receive a status of a co-processor;
- an entropy decoding accelerator adapted to perform entropy decoding operations on entropy-coded code in the data stream and coupled to the core decoder processor via the co-processor interface, wherein the entropy decoding accelerator is adapted to provide status data indicative of a status of the entropy decoding accelerator to the co-processor status register; and
- a second decoding accelerator adapted to assist the core decoder processor with a second decoding function, wherein the second decoding accelerator is adapted to provide status data indicative of a status of the second accelerator to the co-processor status register.

25. A decoding system comprising:
- a core decoder processor adapted to perform decoding functions on a coded data stream and having a co-processor interface, the co-processor interface including a co-processor status register adapted to receive a status of a co-processor;
- a first decoding accelerator adapted to assist the core decoder processor with a first decoding function and coupled to the core decoder processor via the co-processor interface, wherein the entropy decoding accelerator is adapted to provide status data indicative of a status of the entropy decoding accelerator to the co-processor status register; and
- a second decoding accelerator adapted to assist the core decoder processor with a second decoding function, wherein the second decoding accelerator is adapted to provide status data indicative of a status of the second accelerator to the co-processor status register, wherein the second decoding accelerator comprises one of an inverse quantizer, an inverse transform module, a pixel filter, a motion compensation module and a deblocking filter.

26. A decoding system comprising:
- a core decoder processor adapted to perform decoding functions on a coded data stream and having a co-processor interface, the co-processor interface including a co-processor status register adapted to receive a status of a co-processor;
- a first decoding accelerator adapted to assist the core decoder processor with a first decoding function and coupled to the core decoder processor via the co-processor interface, wherein the entropy decoding accelerator is adapted to provide status data indicative of a status of the entropy decoding accelerator to the co-processor status resister; and
- a second decoding accelerator adapted to assist the core decoder processor with a second decoding function, wherein the second decoding accelerator is adapted to provide status data indicative of a status of the second accelerator to the co-processor status register and wherein the second decoding accelerator is coupled to the core decoder processor via an interface other than the co-processor interface.

* * * * *